(12) United States Patent
Keraly et al.

(10) Patent No.: US 12,030,731 B2
(45) Date of Patent: Jul. 9, 2024

(54) AUTOMATED PRODUCTION WORK CELL

(71) Applicant: RIOS Intelligent Machines, Inc., Palo Alto, CA (US)

(72) Inventors: Christopher Lalau Keraly, San Francisco, CA (US); Christopher A. Paulson, Belmont, CA (US); Nicholas L. Choi, South San Francisco, CA (US); Laura L. Sullivan, Redwood City, CA (US); Leo Keselman, Santa Clara, CA (US); Michael Benedict, Palo Alto, CA (US); Kent A. Evans, Cupertino, CA (US); Scott M. Dellenbaugh, Fremont, CA (US)

(73) Assignee: RIOS Intelligent Machines, Inc.

( * ) Notice: Subject to any disclaimer, the term of this patent is extended or adjusted under 35 U.S.C. 154(b) by 345 days.

(21) Appl. No.: 17/480,962

(22) Filed: Sep. 21, 2021

(65) Prior Publication Data

US 2023/0092690 A1    Mar. 23, 2023

(51) Int. Cl.
*B65G 47/91* (2006.01)
*B25J 9/00* (2006.01)
*B25J 9/16* (2006.01)
*B25J 15/06* (2006.01)

(52) U.S. Cl.
CPC .......... *B65G 47/917* (2013.01); *B25J 9/0093* (2013.01); *B25J 9/1697* (2013.01); *B25J 15/0683* (2013.01)

(58) Field of Classification Search
CPC ..... B65G 47/917; B25J 9/0093; B25J 9/1697; B25J 15/0683
See application file for complete search history.

(56) References Cited

U.S. PATENT DOCUMENTS

| | | | | |
|---|---|---|---|---|
| 5,641,072 A | * | 6/1997 | Otake | B65G 47/38 209/580 |
| 2009/0320417 A1 | * | 12/2009 | Gilmore | B65G 47/90 53/235 |
| 2013/0076891 A1 | * | 3/2013 | Childress | G01N 21/9081 901/14 |
| 2013/0110280 A1 | * | 5/2013 | Folk | B25J 9/0093 700/215 |

(Continued)

*Primary Examiner* — Joseph M Rocca
*Assistant Examiner* — Mohamad O El Sayah
(74) *Attorney, Agent, or Firm* — Bever, Hoffman & Harms, LLP

(57) ABSTRACT

A robotic work cell uses an object separating mechanism to disperse bulk objects into a 2D arrangement on a horizontal surface and uses a vision system to generate pick-up (positional) data and rotational orientation data for each sequentially selected target object of the 2D arrangement. A pick-and-place robot mechanism uses the positional data to pick-up each target object and uses the rotational orientation data to reorientate the target object during transfer to a designated hand-off location. A carousel-type robotic end-tool disposed on a 4-axis object-processing robot mechanism rotates a gripper mechanism around a vertical axis to move the target object from the hand-off location to a designated processing location, where an associated processing device performs a desired process (e.g., label application) on the target object. In one embodiment the gripper mechanism is selectively rotatable around a horizontal axis to facilitate processing on opposing surfaces of the target object.

14 Claims, 12 Drawing Sheets

(56) References Cited

U.S. PATENT DOCUMENTS

| | | | |
|---|---|---|---|
| 2016/0243590 A1* | 8/2016 | Crest | B65G 47/918 |
| 2018/0282079 A1* | 10/2018 | Heath | B25J 9/1697 |
| 2019/0031452 A1* | 1/2019 | Koga | B65G 47/905 |
| 2019/0283241 A1* | 9/2019 | Eto | B65G 47/917 |
| 2020/0078941 A1* | 3/2020 | Oka | B25J 9/1653 |
| 2022/0289501 A1* | 9/2022 | Sun | B65G 47/917 |
| 2022/0331963 A1* | 10/2022 | Knobel | B25J 9/1666 |
| 2022/0380077 A1* | 12/2022 | Ronchi | B65B 57/10 |

* cited by examiner

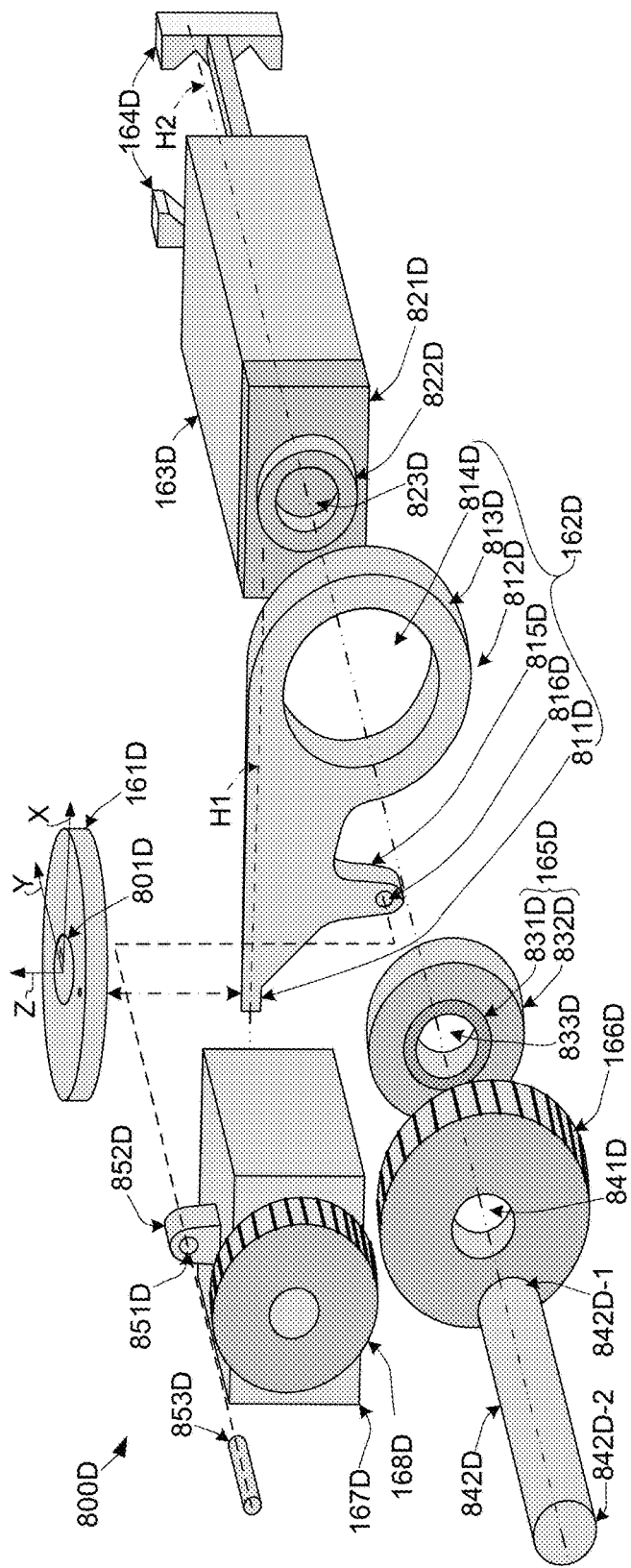
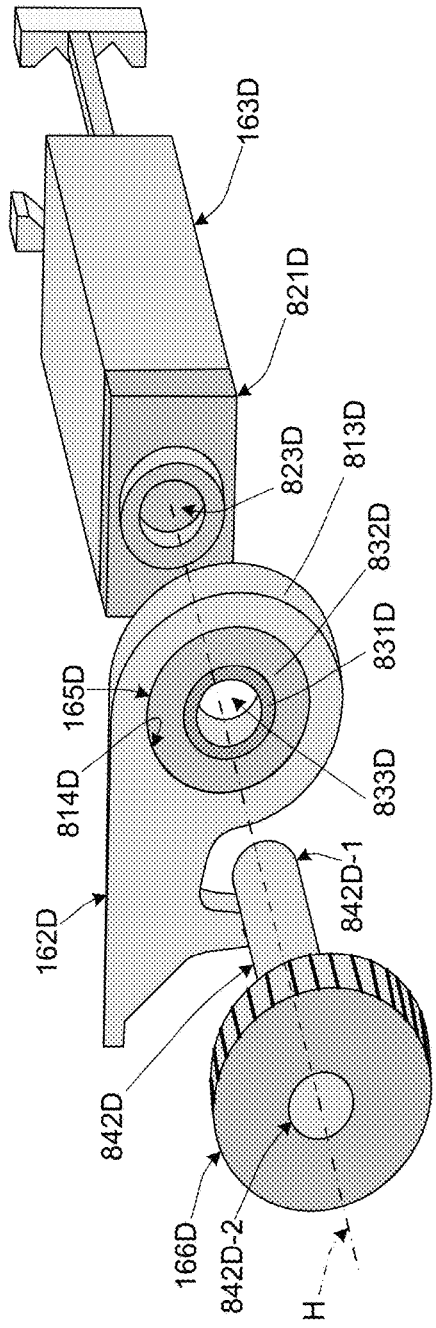
FIG. 8A
FIG. 8B

AUTOMATED PRODUCTION WORK CELL

FIELD OF THE INVENTION

This invention relates to automated production systems, and more particularly and more particularly to robotic work cells, end-tools and methods and is directed to processing bulk objects (i.e., many objects loosely contained in a 3D cluster).

BACKGROUND OF THE INVENTION

Promo (promotional) products (aka, swag or freebies) are low-cost consumer goods that are customized (i.e., branded with a logo or slogan) and given away or sold at a loss to promote an organization, corporate identity, or event. The consumer goods utilized as promo products are often mass produced in a generic (unlabeled) form and sold in bulk to wholesalers (or directly to end-user distributors) who then customize the promo products (i.e., supplementally process each promo product to include a printed or adhered label) to include an end-distributor's brand, logo and/or slogan. For example, hand sanitizer bottles (i.e., plastic bottles containing hand sanitizer gel) are currently a very popular type of promo product that serve as effective message-bearers for restaurants and health clinics. In this case the hand sanitizer bottles are typically produced in an unlabeled form and sold in bulk to wholesalers who specialize in customizing the bottles for distribution by their various client restaurants/clinics to patrons and other end-user consumers. As a result, end-user consumers often encounter two essentially identical hand sanitizer bottles bearing two different brand/logo labels.

Recent improvements in automation (e.g., robotic systems or work cells) have incentivized manufacturers to replace manual labor (human operators) with robotic systems in the performance of many repetitive manufacturing processes. However, state-of-the-art robotic systems are unable to match the speed and accuracy of human operators in the performance of many bulk item processing tasks, such as tasks associated with promo product customization. For example, the customization of promotional hand sanitizer bottles requires a human operator to pick up an unlabeled bottle from a bulk supply (e.g., a bin or box) and to properly reorient and position the bottle so that a label applicator applies a brand label onto the bottle's bare front surface, often at peak rates of 30-60 items per minute. An impediment to automation of this promo product customization process is that state-of-the-art robotics cannot sort jumbled items, such as the hand sanitizer bottles randomly disposed in a bin, at the rate and accuracy achieved by human operators. That is, state-of-the-art robotics cannot match human's ability to distinguish a selected bottle from adjacent randomly oriented bottles disposed in a bulk pile, to adjust hand and finger movements to selectively separate (i.e., pickup and remove) only the selected bottle, and to re-orient and precisely position the selected bottle in the proper orientation (e.g., frontside up) such that a label printer/applicator applies a brand label onto a central region of the bottle's frontside surface. This impediment arises because existing robotic systems have difficulty manipulating their end effectors to effectively pick up plastic bottles/objects having random orientations and random positions and have difficulty delivering the picked-up bottles/objects to a label applicator (or other processing device) with sufficient precision (i.e., such that the applied brand labels are accurately centered on each bottle's front surface). Therefore, despite recent advances in automation technology, bulk item processing like the promo product customization process described above is currently performed manually.

Another problem associated with the automation of bulk item processes arises when a selected state-of-the-art robotic system occupies a larger footprint (i.e., amount of warehouse floor space) than that required for the human-occupied workspace that is being replaced by the work cell. That is, if the workspace required for a human operator and human-operated processing device to process fifty hand sanitizer bottles per minute is equal ten square feet of warehouse floor space, then a one-hundred square foot warehouse area can accommodate ten human operators and therefore utilized to generate 500 bottles per minute. If the ten human operators are replaced by five hypothetical robotic systems that occupy twenty square feet apiece, then the same one-hundred square foot warehouse area would only accommodate a maximum of five systems, thereby requiring each system to process one hundred bottles per minute to produce brand labeled hand sanitizer bottles at the same rate as the human operators. Therefore, in cases where additional floor space is unavailable and a selected robotic system performs a given bulk item process at a rate that is comparable to that achieved by human operators, automation of the bulk item process may be considered impractical.

What is needed is a reliable and cost-effective robotic work cell (system) and method that is capable of processing bulk objects (e.g., performing the promo product customization process described above) at a rate comparable to or greater than that achieved by human operators. More specifically, what is needed is a robotic end-tool and/or work cell that facilitate automatically separating (i.e., identifying and individually removing) bulk objects randomly disposed in a 3D cluster and then accurately re-orienting and positioning the objects for subsequent processing (e.g., such that a brand label is reliably affixed in the center of each bottle's front surface).

SUMMARY OF THE INVENTION

The present invention is directed to a robotic work cell and an associated method for separating and sequentially performing a designated process on bulk objects (i.e., multiple objects disposed a jumbled three-dimensional (3D) cluster). First, portions of the 3D cluster are formed into two-dimensional arrangements of objects, which in an exemplary embodiment is performed using an object separating mechanism that utilizes dynamically manipulation to separate the objects on a horizontal surface, thereby facilitating identification of individual objects in a minimal space using a conventional vision system or other cost-effective object sensing system. Next, a target object is selected from the objects forming the 2D arrangement, and location and rotational orientation data are generated that identify the selected target object's position and rotational orientation on the horizontal surface. The location data is then used to control a pick-and-place (first) robot mechanism to selectively remove the selected target object from the 2D arrangement for transfer to a designated hand-off location, and the rotational orientation data is utilized to rotate the target object into a designated hand-off orientation during the transfer (i.e., while moving from the horizontal surface to the hand-off location). In one embodiment a six-axis robot serves as the pick-and-place (first) robot mechanism and is operably configured (programed) to perform the pick-up, rotation and transfer processes such that the target object is operably positioned and oriented in the hand-off location for transfer (hand-off) to a gripper mechanism, which is disposed on a carousel-type robotic end-tool that is operably connected to the end-shaft of an object processing (second) robot mechanism (e.g., a four-axis robot). Either before, during or after the transfer process, the object processing (second) robot positions the carousel-type robotic end-tool such that the gripper mechanism is operably positioned to grasp or otherwise take possession of the target object from the pick-and-place robot when the target object is moved into the designated hand-off location by the pick-and-place (first) robot. After the gripper mechanism takes possession of the target object, the object processing (second) robot rotates the carousel-type robotic end-tool around a vertical axis defined by the robot's end-shaft to facilitate moving the target object from the designated hand-off location to a designated processing location with minimal horizontal displacement of the robot's end-shaft. When operably positioned in the designated processing location, the designated process is performed on the target object, for example, by actuating a processing device located adjacent to the processing location. By combining the formation of 2D object arrangements on a horizontal surface, using a first robot to pick-up, orientate and transfer target objects to a hand-off location, and using a second robot to rotate/manipulate a carousel-type robotic end-tool as described herein, the present invention facilitates reliable bulk object processing at a rate comparable to or greater than that achieved by human operators while requiring a footprint (i.e., occupying a floorspace area) that is comparable to that required for comparable human-operated processing devices.

In an exemplary embodiment a robot work cell combines the use of an object separating mechanism, a vision system, a pick-and-place-type (first) robot mechanism, an object-processing (second) robot and the carousel-type robotic end-tool to facilitate bulk object processing by a selected processing device at a rate comparable to or greater than that achieved by human operators while having a footprint (i.e., occupying a floorspace area) that is comparable to that required for comparable human-operated processing devices. The object separating mechanism includes a horizontal surface and a dynamic manipulator that generates a separating force such that objects received on the horizontal surface form the desired spaced-apart 2D arrangement in a minimum amount of space. The vision system utilizes known techniques to periodically image the horizontal surface, select a target object from the 2D arrangement, and generate position and rotational orientation data for the selected target object as described above. The pick-and-place (first) robot mechanism then utilizes the position data to secure and lift (pick-up) the selected target object from the horizontal surface for transfer to a designated hand-off location, and utilizes the rotational orientation data to rotate (reorient) the target object into the optimal hand-off orientation during the transfer process. The object-processing (e.g., 4-axis or other) robot includes a robot arm having an end-shaft disposed at its distal end that is fixedly aligned in a first (e.g., vertical) direction. The robotic end-tool includes a central hub fixture that is fixedly connected to the end-shaft and one or more gripper mechanisms that are connected to the central hub fixture by an associated mounting flange. During operation, the object processing robot is configured to rotate the robotic end-tool around the vertical (Z) axis to cycle the gripper mechanism between the designated hand-off location and the designated processing location. In one embodiment the gripper mechanism is maintained in a horizontal plane when the central hub fixture is rotated around the vertical axis and the gripper mechanism moves from the hand-off location to the designated processing location. When the gripper mechanism is in the hand-off location, the gripper mechanism's opposing pair of gripper structures are operably positioned to take possession of (grasp) a target object from the pick-and-place robot mechanism, and subsequent rotation of the robotic end-tool around the vertical axis (along with any necessary adjustments in the horizontal and vertical directions) positions the gripper mechanism such that the gripper structures position the target object in the designated processing location. The processing device (e.g., a label applicator mechanism) is operably positioned to perform the desired processing operation on the target object when moved into the designated processing location. In some embodiments the fully processed target object is then released by the gripper mechanism during subsequent rotation of the carousel-type robotic end-tool such that the fully processed target object falls into an output bin. By combining the use of a pick-and-place-type (first) robot mechanism that is configured to reorient objects before handing them off to a carousel-type robotic end-tool mounted on an object processing robot mechanism, and by utilizing the carousel-type robotic end-tool to minimize operating movements of the object processing robot mechanism during processing of target objects, robotic work cells produced in accordance with the present invention facilitate bulk object processing at a rate comparable to or greater than that achieved by human operators while occupying a footprint (e.g., warehouse floorspace area) that is comparable to that required for comparable human-operated processing devices.

In a specific exemplary embodiment an object separating mechanism utilized by work cells of the present invention include a gating mechanism, a movable horizontal surface and a stationary frame to achieve separation of dispensed objects for selection and removal. The gating mechanism is configured to dispense (selectively pass) groups of objects from a bulk supply (e.g., by way of an intervening feed chute) onto the movable horizontal surface. In one embodiment the movable horizontal surface is implemented by the upward facing surface of a horizontally disposed conveyor belt that surrounded by the stationary frame that functions to retain dispensed objects on the horizontal surface. In another specific embodiment, the object separating mechanism is utilized in conjunction with the vision system (or another object sensing system) to facilitate the formation of 2D arrangements on the horizontal surface. For example, when the vision system determines that a number of objects currently disposed on the horizontal surface is less than a predetermined minimum number, the gating mechanism is actuated (opened) to feed additional objects from the 3D cluster onto the horizontal surface. In addition, when the vision system determines that the currently dispensed number of objects is sufficient but that a spacing between the dispensed objects is too small (e.g., the dispensed objects are too crowded together to identify individual target objects), then the conveyor belt's drive motor is actuated in order to cause the currently disposed objects disposed on the horizontal surface to move relative to the raised frame (e.g., such that dispensed objects are effectively vibrated in a way that causes them to become separated from each other). Note that, in this context, at least one of the gating mechanism, the conveyor belt's drive motor and the raised frame serve as a dynamically manipulator (e.g., by selectively causing the upper belt surface to move back and forth to drive the objects dispensed onto the horizontal surface by the gating mechanism against the stationary frame, thereby applying corresponding separating forces that cause the dispensed objects to separate from each other). When the objects are sufficiently separated and stationary, the vision system images (i.e., generates current digital image data of) the horizontal surface, then identifies individual objects (e.g., by way of comparing the current image data with stored image data that operably describes the objects). The vision system (or other control system) then selects (designates) one of the identified objects as the next target object, generates location and rotational orientation data for the selected target object, and then transmits the location and rotational orientation data to the pick-and-place robot mechanism to facilitate the pick-up/removal and transfer of the selected target object to the hand-off location. By dividing the jumbled 3D cluster into separate portions and dynamically manipulating the objects in each portion in this manner, the object separating mechanism simplifies the task of identifying and transferring individual objects, thereby enabling separation and sequential processing of bulk objects using low-cost systems and a minimal amount of floorspace.

In a presently preferred embodiment, the work cell's object separating mechanism includes two or more separating units, where each separating unit is configured as described above and arranged such that the two or more conveyor belts are disposed in a parallel side-by-side configuration, and such that the gating mechanisms of the two or more separating units communicate with the same bulk supply (e.g., by way of associated intervening feed chutes). This parallel side-by-side configuration further increases object processing rates by allowing the vision system to image a first group of stationary objects disposed on the (first) horizontal surface of a first separating unit while a second separating unit dynamically manipulates a second group of objects disposed on its (second) horizontal surface, and at a later time to image stationary objects disposed on the second separating unit during dynamically manipulation of objects by the first separating unit.

According to a presently preferred embodiment, the robotic work cell utilizes a mini six-axis robot to implement pick-and-place operations, a mini four-axis robot to manipulate the carousel-type robotic end-tool, and a control unit (shared power/control resources) that is configured to transmit control signals in a sequence that coordinates operations performed by the six-axis robot, the four-axis robot and the robotic end-tool to achieve the desired bulk object processing described herein. In a practical embodiment, the six-axis robot and the mini four-axis robot are secured at their fixed ends to a rigid base plate (e.g., a horizontally oriented plate metal sheet) with the carousel-type robotic end-tool held by a vertically oriented end-shaft of the four-axis robot above the base plate, and with the shared power/control resources mounted below the base plate. In some embodiments the work cell includes a vacuum system that selectively supplies suction (vacuum) force to a suction cup disposed on a distal end portion of the six-axis robot to facilitate transferring target objects in the manner described herein. In some embodiments the control unit implements at least a portion of the vision system (for example, to process current image data and generate location and rotational orientation data for selected target objects disposed). The control unit also transmits corresponding control signals in a manner that coordinates the various robots, systems and mechanisms to facilitate, for example, the pick-up of selected target objects from the object separating mechanism and hand-off to the carousel-type robotic end-tool.

In one embodiment the present invention is directed to a carousel-type robotic end-tool configured for use with a 4-axis (or other) robot. The robotic end-tool includes multiple gripper mechanisms connected to a central hub fixture by way of associated mounting flanges as described above, and is further characterized in that each gripper mechanism is able to selectively rotate around a corresponding horizontal axis (second axial direction) to facilitate inverting (i.e., flipping from backside-up to frontside-up) a target object held by the gripper structures of the gripper mechanism by way of rotating the gripper mechanism 180° around its corresponding horizontal axis. In an exemplary embodiment each gripper mechanism rotatably connected to an associated mounting flange by an associated bearing, and a drive motor is configured to selectively transmit a drive (rotating) force to each gripper mechanism by way of an intervening drive train. In a specific embodiment, a rolling-element bearing is mounted within a bearing ring structure integrally formed on the mounting flange, the drive motor is connected to a motor mount structure disposed adjacent to the bearing ring structure, and the drive train includes a drive belt that transmits the rotational drive force generated by the drive motor to a drive axle that is connected to the gripper mechanism by way of the associated rolling-element bearing. This arrangement facilitates selective inversion (flipping over) of target objects grasped by each gripper mechanisms, thereby significantly enhancing the operating versatility and object processing rate of a robotic work cell (or other robotic system) that utilizes the carousel-type robotic end-tool.

According to another embodiment, a robotic work cell includes a positioning structure having positioning blocks (or other structures) formed with beveled edges that surround a positioning location, and the object processing (four-axis) robot is further configured to move each target object (i.e., by way of carousel-type robotic end tool) into a first position above the positioning structure, and then downward toward the positioning location. With this arrangement the beveled edges receive the side edges of each target object even if the target object is being held by an associated gripper mechanism in non-optimal position, and the beveled edges guide the target object into the optimal position as the target object is moved downward into the processing location, thereby precisely aligning each target object for processing by a label applicator or other processing device, thus increasing processing through-put and minimizing processing errors.

According to another presently preferred practical embodiment each robotic work cell includes two work cell units mounted onto a single base plate (e.g., an integral plate metal sheet) in an inverted mirror arrangement, where each work cell unit includes an associated object separating unit, pick-and-place robot mechanism, 4-axis robot mechanism with associated carousel-type robotic end-tool, processing device and positioning structure cooperatively configured in the manner described above. Arranging the work cell units in an inverted mirror arrangement with the four robot mechanisms disposed adjacent each other near a central region of the base plate facilitates both reduced overall costs (i.e., by way of sharing power and/or control resources) and achieves a further reduction of each work cell's effective footprint.

BRIEF DESCRIPTION OF THE DRAWINGS

These and other features, aspects and advantages of the present invention will become better understood with regard to the following description, appended claims, and accompanying drawings, where:

FIGS. 8A, 8B, 8C and 8D are perspective views depicting a gripper assembly according to an exemplary embodiment;

DETAILED DESCRIPTION OF THE DRAWINGS

The present invention relates to an improvement in robotic work cells utilized to process bulk objects. The following description is presented to enable one of ordinary skill in the art to make and use the invention as provided in the context of a particular application (i.e., placing brand labels on promotional hand sanitizer bottles) and its requirements. As used herein, directional terms such as "upper", "lower", "upward", "downward", "above", "below", "horizontal" and "vertical" are intended to provide relative positions for purposes of description and are not intended to designate an absolute frame of reference. Similarly, although the Z-axis arrows utilized in the various figures consistently depict a vertical direction, the X- and Y-axis arrows utilized to depict horizontal directions may differ in the various figures (i.e., be rotated around the Z-axis direction) for descriptive purposes. In some instances the two robot mechanisms utilized by each exemplary work cell described below are referred to as robots for brevity (i.e., the term "robot" and phrase "robot mechanism" are intended to be synonymous). Various modifications to the preferred embodiment will be apparent to those with skill in the art, and the general principles defined herein may be applied to other embodiments. Therefore, the present invention is not intended to be limited to the embodiments shown in the figures and described below, but is to be accorded the widest scope consistent with the principles and novel features herein disclosed.

Figure 1:
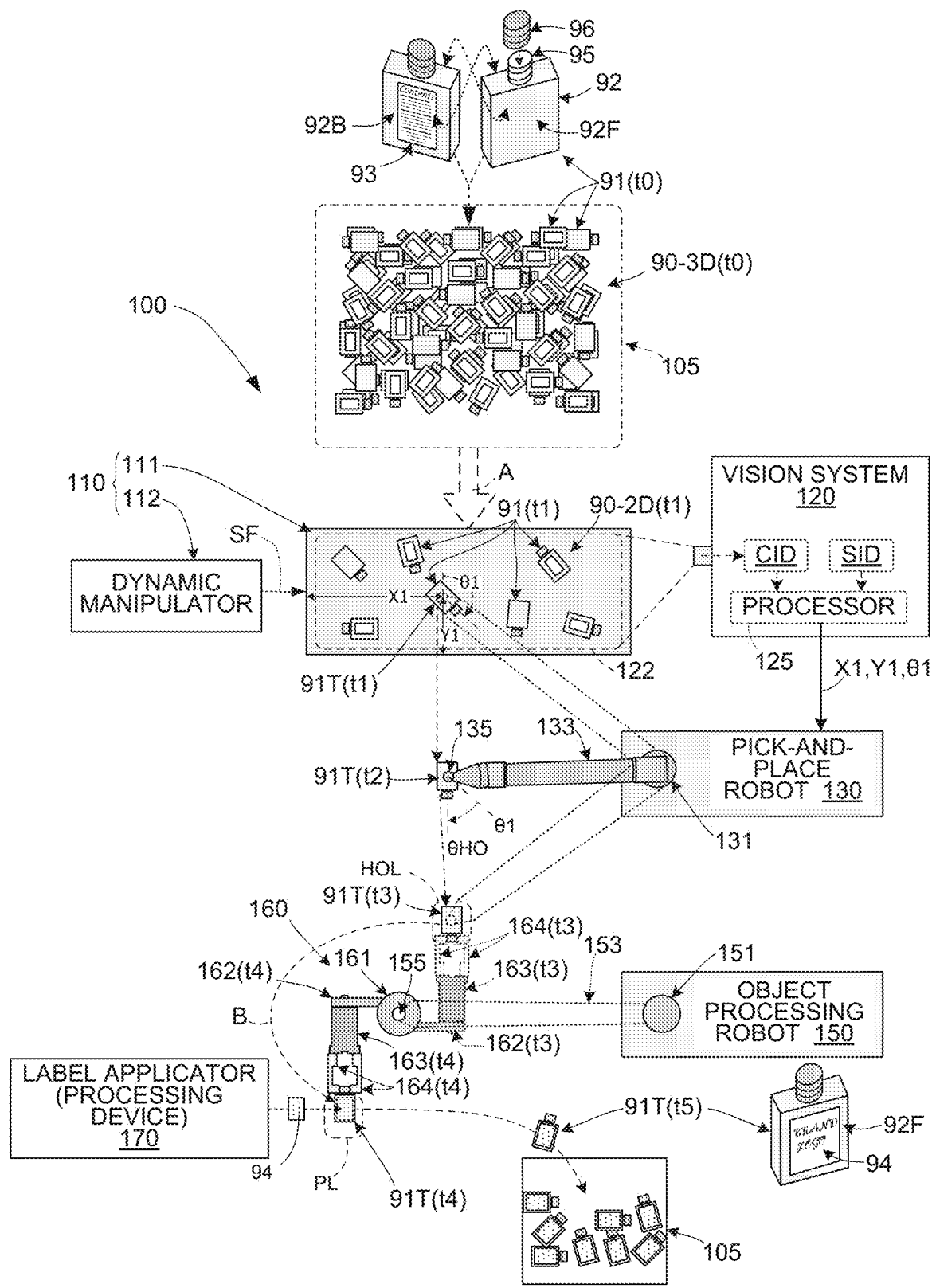
FIG. 1 depicts a robotic work cell according to a simplified exemplary embodiment of the present invention.

FIG. 1 depicts an exemplary robotic work cell 100 configured for separating and sequentially performing a brand label application process on bulk hand sanitizer bottles (objects) 91(t0) that are supplied to robotic work cell 100 in a randomly arranged 3D cluster 90-3D(t0). As indicated at the top of FIG. 1, each hand sanitizer bottle 91(t0) supplied to work cell 100 in 3D cluster 90-3D(t0) is a standard bottle-type container including a container body 92 configured to store a small quantity (e.g., two ounces) of hand sanitizer gel, a cylindrical neck 95 that extends from an upper flange of container body 92, and a cylindrical cap 96 is that fixedly connected (e.g., by way of helical threads) onto cylindrical neck 95. In one embodiment bottles 91(t0) are provided with a content label 93B adhered to a rear surface 92B of container body 92, whereas a front surface 92F of container body 92 is left bare (blank) in preparation for the designated process involving application of brand labels as described below. Although the present invention is described with reference to a single specific designated process (i.e., applying brand labels 94) that is performed on a specific type of objects (i.e., hand sanitizer bottles 91), those skilled in the art will understand that robotic work cell 100 may be easily modified to perform any number of alternative designated processes on a wide range of object types. For example, personal care products such as deodorant, shampoo, packaged soap, drink and tableware, consumer packaged goods (e.g., candy bars). In general, the system described herein is configured to manipulate any rigid bodied object less than six inches on a side and weighing less than one pound.

Parenthetical time-based suffixes are utilized in the figures and description below to indicate certain objects or features at sequentially different points in time during the operation of an exemplary work cell of the present invention. For example, time-based suffixes t0, t1, t2 and t3 are utilized in FIG. 1 to indicate bottles 91 at different points in time, where "91(t0)" indicates bottles 91 at an initial time t0 when disposed in 3D cluster 90-3D, "91(t1)" indicates bottles 91 at a subsequent time t1 when part of 2D arrangement 90-2D, and "91T(t2)", "91T(t3)" and "91T(t4)" indicate a target bottle (target object) 91T after being selected and picked up from 2D arrangement 90-2D and subsequently positioned for the designated label application process, with "91T(t5)" indicating the target bottle after processing is completed. Similar time-based suffixes are used to indicate relative positions of robot mechanisms and other structures/features during the operation of work cell 100. In contrast, when an bottle/object or structure/feature is mentioned below without a time-related suffix (e.g., "target bottle 91"), it is understood that the mentioned bottle/object or structure/feature is being referenced generally (i.e., at any point before, during or after the designated process).

As indicated in FIG. 1, work cell 100 generally includes an object separating mechanism 110, a vision system 120, a pick-and-place (first) robot 130, an object processing (second) robot 150, a carousel-type robot end-tool (end-tool) 160, and a label applicator (processing device) 170 that are configured and arranged as described below to facilitate the designated brand label application process.

Referring to the upper portion of FIG. 1, object separating mechanism 110 includes a horizontal surface 111 and a dynamic manipulator 112 that cooperatively rearrange bottles received from 3D cluster 90-3D into 2D arrangement 90-2D. That is, horizontal surface 111 is configured and arranged to receive bottles 91(t1) from 3D cluster 90-3D (as indicated by dashed lined arrow A in FIG. 1), and dynamic manipulator 112 is configured and arranged to separate bottles 91(t1) from each other. As used herein, the phrase "2D arrangement" is used to describe objects that are necessarily disposed in a common horizontal plane when resting on a horizontal surface, and is used to distinguish 2D arrangements (e.g., bottles 91(t1) resting on horizontal surface 111) from 3D arrangements (e.g., bottles 91(t0) forming 3D cluster 90-3D). Those skilled in the art will understand that bottles/objects dispensed onto a horizontal surface as described herein will assume a random pattern, and in this sense the phrase "2D arrangement" is not intended to mean that the associated bottles/objects are arranged in an organized pattern. In preferred embodiments the number of bottles 91(t1) received at time t1 represents a portion (fraction or subset) of a larger number of bottles 91(t0) forming 3D cluster 90-3D to facilitate the separation and target object selection processes described below, but in other embodiments an entirety of bottles 91(t0) may be simultaneously deposited onto horizontal surface 111. Dynamic manipulator 112 is configured to apply a separating force SF either to horizontal surface 111 or to bottles 91(t1) in a manner designed to separate the received portion such that at least some of bottles 91(t1) are randomly separated (spaced from) each other, whereby the resulting 2D arrangement 90-2D(t1) simplifies the process of selecting and securing (picking up) target bottles/objects as described below.

Vision system 120 is a vision-based sensing system configured to sequentially identify (select) individual target bottles/objects from the bottles/objects 91(t1) forming 2D arrangement 90-2D(t1) and to generate data that facilitates the removal of each selected target bottle/object from horizontal surface 111 and subsequent delivery to a designated hand-off location HOL by pick-and-place robot 130. In one embodiment, vision system 120 utilizes a camera or other device configured to capture current image data CID from a capture image region 122 including horizontal surface 111, identifies individual bottles/objects 91(t1) by comparing current image data CID with stored image data SID using software executed by a processor 125, and then selects a target bottle 91T(t1) from other identified bottles/objects 91(t1) using known techniques. In the embodiment depicted in FIG. 1, current image data CID includes image data that allows processor 125 to distinguish upside-down bottles (i.e., bottles of 2D arrangement 90-2D(t1) having their rear surface facing upward) from frontside-up bottles (i.e., bottles of 2D arrangement 90-2D(t1) having their front surface facing upward), and target bottle 91T(t1) is exclusively selected from identified frontside-up bottles. In other embodiments (e.g., as described below with reference to FIGS. 10A to 10C), the upside-down/frontside-up orientation of the bottles forming 2D arrangement 90-2D(t1) is not relevant to the target object selection process. Once target bottle 91T(t1) is selected, processor 125 generates location data (e.g., an X-axis location X1 and a Y-axis location Y–1 that operably describe the X-Y location of target bottle 91T(t1) on horizontal surface 111) and orientation data θ1 describing a rotational orientation of target bottle 91T(t1) relative to a predefined rotational direction, and then transmits the generated data (e.g., in the form of control signals) to pick-and-place robot 130.

Pick-and-place robot mechanism 130 is configured to move target bottle 91T(t1) from horizontal surface 111 to designated hand-off location HOL in a manner that facilitates a hand-off operation (described below) using location data X1,Y1 and rotational orientation data θ1, which is generated as described above. In one embodiment, pick-and-place robot mechanism 130 includes a robotic arm 133 connected at a fixed (first) end to a base portion 131 and having a suitable end-tool 135 disposed at its distal (second) end. Pick-and-place robot mechanism 130 that is controlled in accordance with location data X1,Y1 to move and operably position end-tool 135 (e.g., a suction cup or other end-tool grasping mechanism) in a manner that facilitates securing/grasping and lifting target bottle 91T(t1)) from horizontal surface 111 by way of end-tool 135 at time t1. Pick-and-place robot mechanism 130 is also configured to maintain grasping control of a target object by way of end-tool 135 while moving from horizontal surface 111 toward designated hand-off location HOL (e.g., as indicated by target bottle 91T(t2)), and to release the target object from end-tool 135 in designated hand-off location HOL after a successful hand-off to robotic end-tool 160 as described below. Pick-and-place robot mechanism 130 is further configured to utilize the rotational orientation data θ1 to rotate the target bottle 91T(t2) into a designated hand-off orientation θHO while moving target bottle 91T(t2) between horizontal surface 111 and designated hand-off location HOL.

Object processing robot 150 functions to position and rotate carousel-type robotic end-tool 160 during operation of work cell 100. In one embodiment, object processing robot 150 includes a robotic arm 153 that is connected a fixed (first) end to a base portion 151 and includes an end-shaft 155 disposed at its distal end, where object processing robot 150 is configured such that end-shaft 155 is aligned in and rotatable around a vertical (Z-axis) direction to maintain robotic end-tool 160 in a horizontal (X-Y) plane during the work cell operations described in additional detail below. Carousel-type robotic end-tool 160 has a central hub fixture 161 that is fixedly connected to end-shaft 155 and includes at least one gripper mechanism 163 that is connected to central hub fixture 161 by an associated mounting flange 162 a manner that maintains gripper mechanism 163 in a horizontal orientation when robotic end-tool 160 is rotated by object processing robot 150 around a vertical axis extending through end-shaft 155. That is, robotic end-tool 160 is configured to rotate around the vertical axis in response to corresponding rotation of end-shaft 155 by object processing robot 150, and gripper mechanism 163 is maintained in the same X-Y plane throughout this rotation by way of its connection to central hub fixture 161 by central flange 162. Gripper mechanism 163 includes a pair of opposing gripper structures 164 that are operably configured to grasp and maintain control of the target bottle when moved from designated hand-off location HOL (i.e., as indicated by gripper structures 164(t3) holding target bottle 91T(t3) in FIG. 1) to a designated processing location PL (i.e., as indicated by gripper structures 164(t4) holding target bottle 91T(t4)).

Label applicator 170 serves as an exemplary processing device that is operably configured and positioned to perform the designated process (i.e., to apply brand/logo labels 94 onto the front surface of target bottle 91T(t4) when positioned in designated processing location PL by robotic end-tool 160. Label applicators of a type suitable for performing the depicted process are known in the art. In other embodiments (not shown), work cell 100 may include other (different) processing devices in place of or in addition to label applicator 170. For example, label applicator 170 may be replaced by a label printing or etching device that produces brand labels using ink printed onto the surface of target bottle 91T(t4), or by etching into the surface of target bottle 91T(t4).

Figure 2:
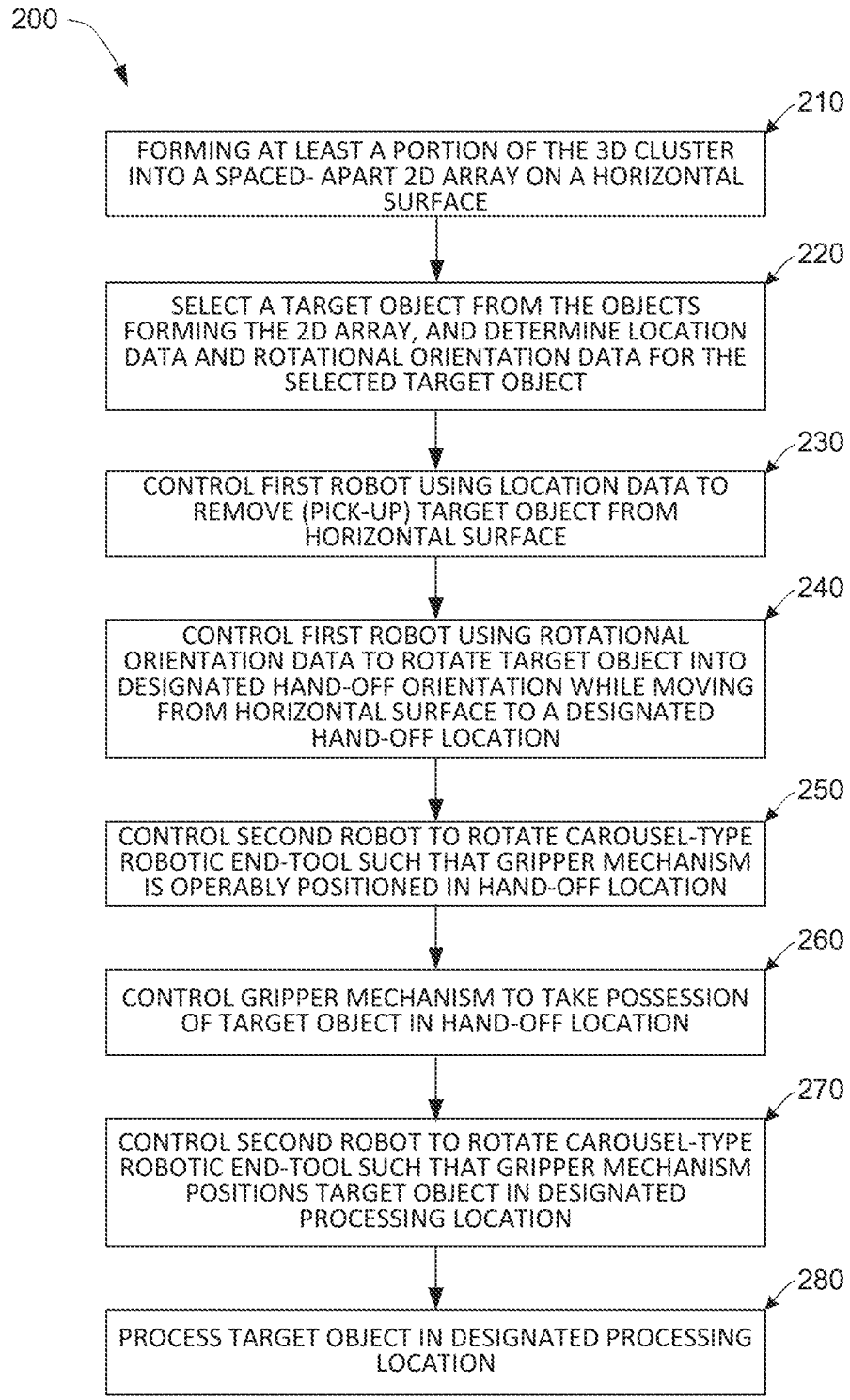
FIG. 2 is flow diagram depicting a method for processing bulk objects according to another embodiment of the present invention.

FIG. 2 includes a flow diagram depicting a generalized method 200 for separating and sequentially performing a designated process on generalized bulk objects that are randomly arranged in a 3D cluster according to another embodiment.

Referring to block 210, the method begins by forming at least a portion of the objects of the 3D cluster into a 2D arrangement on a horizontal surface such that the objects are disposed in a spaced-apart arrangement. This process is depicted in FIG. 1 and described above in the context of the hand sanitizer bottle processing example by way of the formation of 2D arrangement 90-2D(t1) on horizontal surface 111 and is described in further detail below with reference to FIGS. 3A to 5B. In other embodiments the conversion of a 3D cluster of other object types into a 2D arrangement may be implemented using other object separating mechanisms.

Referring to block 220, a target object is then selected from the objects forming the 2D arrangement, and then location and rotational orientation data operably describing the location and rotational orientation of the target object are generated. This process is described above with reference to the operations of vision system 120 and is described in further detail below with reference to FIGS. 4, 5A and 5B. Although the present invention may be implemented using vision system software that utilizes known image processing techniques (e.g., projection, background subtraction, object segmentation, identification, and Kalman filtering) to generate stored image data SID that operably visually describes target objects, operation of the robotic work cells described herein can be enhanced by way of utilizing more sophisticated software capable of detecting individual objects even if they are touching or overlapping, which could further increase work cell processing speeds.

Referring to block 230, the location data is then used to remove (pick-up) the selected target object from the horizontal surface. Referring to the example of FIG. 1, the X-axis position X1 and Y-axis position Y-1 of target bottle 91T(t1) is utilized to control pick-and-place robot 130 (i.e., such that pick-and-place robot 130 controls robot arm 133 to place suction cup 135 onto the upward facing surface of target bottle 91T(t1)). In some embodiments the position data may also include Z-axis position data, but for purposes of brevity this data is omitted as unnecessary because all selected target objects are assumed to be at the same Z-axis position (i.e., because all selected target objects are resting on the horizontal surface, and all points on the horizontal surface have the same Z-axis positional value). Various pick-and-place mechanisms may be utilized to perform this operation, such as the six-axis robot mechanism described below with reference to FIG. 6.

Referring to block 240, during the subsequent transfer of the picked-up selected target object from the horizontal surface to the designated hand-off location, the rotational orientation data is used to rotate the target object into a designated hand-off orientation. In the embodiment of FIG. 1, this rotational operation is performed by pick-and-place robot mechanism 130 and involves rotating target bottle 91T(t2) around a vertical axis extending through suction cup 135.

Referring to block 250, a four-axis robot mechanism is controlled to manipulate a carousel-type robotic end-tool such that a gripper mechanism of the robotic end-tool is operably positioned to grasp (take possession of) the target object when the target object is moved into the designated hand-off location. In the exemplary embodiment of FIG. 1, the four-axis robot mechanism is implemented by object processing robot mechanism 150, which includes carousel-type robotic end-tool 160 operably mounted to its end-shaft 155. As described in additional detail below with reference to FIG. 6, a characteristic of four-axis robot mechanisms is that their end-shafts are maintained in a vertical orientation, and the carousel-type robotic end-tool is connected to the end-shaft such that multiple gripper mechanisms (e.g., such as gripper mechanism 163 shown in FIG. 1) are maintained in a horizontal plane during any manipulation of the carousel-type robotic end-tool (i.e., either rotation around the vertical axis passing through end-shaft 155, or movement in X-, Y- or Z-axis directions) that may be needed to operably position gripper mechanism 163(t3) in designated hand-off location HOL so that gripper structures 164(t3) can take possession of target bottle 91T(t3) from pick-and-place robot 130. Note that performing the process of block 260 may occur before, during or after the processes associated with blocks 210 to 240 (i.e., gripper mechanism 163(t3) may be operably located in designated hand-off location HOL before, concurrent with or after pick-and-place robot 130 moves target bottle 91T(t3) into hand-off location HOL).

Referring to block 260, when the target object is positioned in the designated hand-off location and the gripper mechanism is operably positioned to grasp (take possession of) the target object, the gripper mechanism is then controlled (actuated) such that it takes position of the target object. Referring to the example of FIG. 1, this hand-off process is performed at time t3, when object processing robot 150 operably positions gripper mechanism 163(t3) in hand-off location HOL, and when pick-and-place robot 130 causes robot arm 133 to position suction cup 135 (and, thus, target bottle 91(t3)) in hand-off location HOL. An exemplary hand-off process is described in additional detail below with reference to FIG. 7.

Referring to block 270, the object processing robot is then controlled to manipulate the carousel-type robotic end-tool 160 such that the target object is moved from the designated hand-off location to a designated processing location. As indicated in FIG. 1, the manipulation process performed by object processing robot 150 includes rotating carousel-type robotic end-tool 160 around the vertical axis passing through end-shaft 155. The result of this rotation process is depicted by target bottle 91T(t4), which is indicated in FIG. 1 as being grasped by gripper mechanism 163(t4) and is the result of a 180° rotation of robotic end-tool 160 around the vertical axis passing through end-shaft 155 (i.e., as indicated by dashed-line arrow B). That is, gripper mechanisms 163 is depicted in two positions at two different times t3 and t4, with gripper mechanism 163(t3) being positioned and oriented by mounting flange 162(t3) such that gripper structures 164(t3) extend toward separating mechanism 111 and position target bottle 91T(t3) in or adjacent to hand-off location HOL at time t3, and gripper mechanism 163(t4) being positioned and oriented by mounting flange 162(t4) (i.e., after the 180° rotation indicated by arrow B) such that gripper structures 164(t4) extend away from separating mechanism 111 and position target bottle 91T(t4) in or adjacent to processing location PL at time t4. Note that the manipulation of robotic end-tool 160 by object processing robot 150 such that gripper mechanism 163 transfers target bottle 91T from hand-off location HOL to processing location PL may require small horizontal movements of robotic end-tool 160 (i.e., in addition to the rotation described above), but that these horizontal movements are minimized due to the horizontal displacement of target bottle 91T achieved by the 180° rotation indicated by arrow B, thereby minimizing operational wear-and-tear on object processing robot 150.

Referring to block 280, the designated process is then performed on the target object disposed in the designated processing location. In the example of FIG. 1, the designated brand/logo label application process is performed by label applicator 170, whereby brand/logo label 94 is adhered to the upward facing surface of target bottle 91T(t4). As indicated in the lower portion of FIG. 1, once label 94 is applied/adhered to front surface 92F, fully processed target bottle 91T(t5) is released from (dropped by) gripper mechanism 163 such that, for example, it falls into an output bin 105.

The generalized embodiments described above may be beneficially modified using the additional features and structures described below with reference to FIGS. 3A to 13.

Figure 3A:
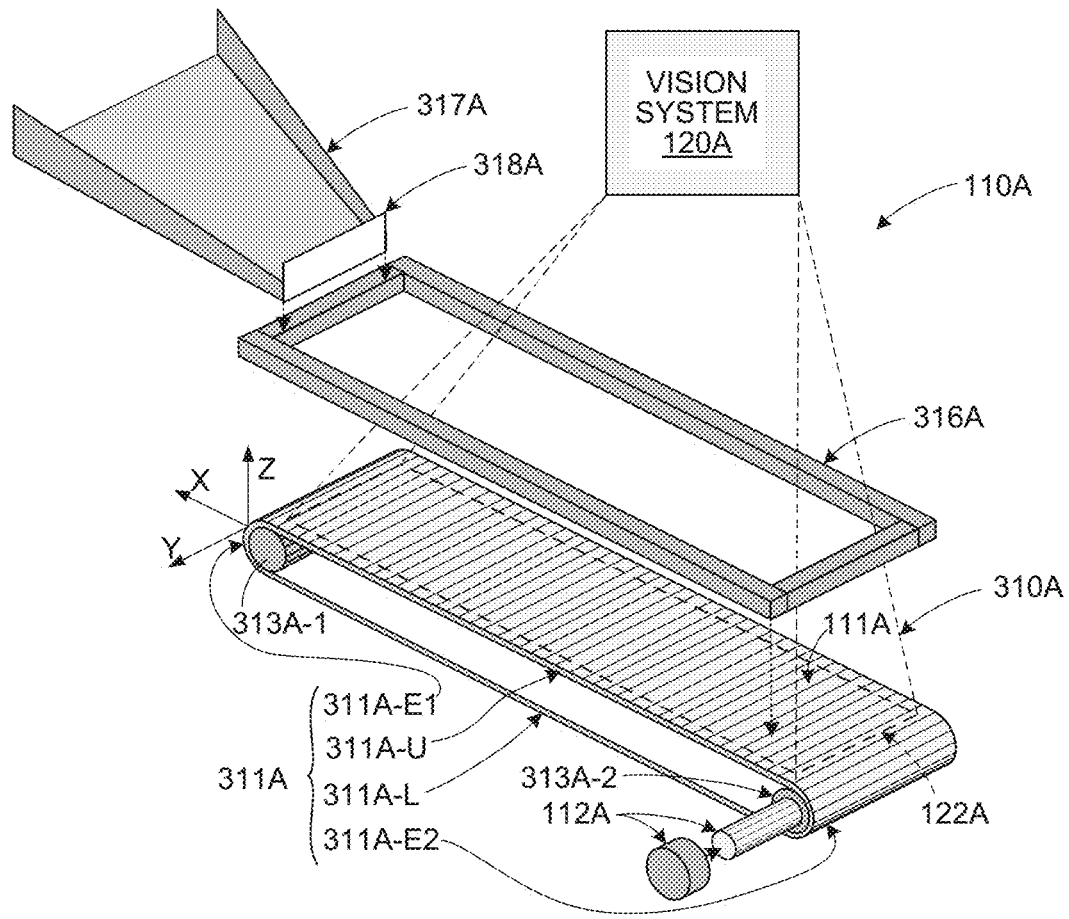
FIGS. 3A and 3B are exploded perspective and assembled perspective views, respectively, showing a separator mechanism utilized by a robotic work cell according to another exemplary embodiment.

FIG. 3A shows an object separation mechanism 110A according to an exemplary specific embodiment of the present invention that may be used in place of generalized object separation mechanism 110 of FIG. 1. Object separation mechanism 110A generally includes a conveyor belt mechanism 310A, a stationary frame 316A and a gating mechanism 318A. Conveyor belt mechanism 310 includes a conveyor belt 311A, horizontally oriented drive rollers 313A-1 and 313A-2 and a drive mechanism 112A. Conveyor belt 311A is a continuous-loop structure trained over horizontally oriented drive rollers 313A-1 and 313A-2 and generally includes an upper belt portion 311A-U, a lower belt portion 311A-L, and two end portions 311A-E1 and 311A-E2 that are respectively extend over horizontally oriented drive rollers 313A-1 and 313A-2 between upper belt portion 311A-U and lower belt portion 311A-L. In this embodiment an upward facing surface of upper belt portion 311A-U (i.e., facing the positive Y-axis direction) forms horizontal surface 111A of conveyor belt mechanism 110A. Drive mechanism 112A (e.g., an electric motor) is operably coupled (e.g., by way of a gear train and/or drive shaft) to drive roller 313A-2 and is configured to cause horizontally oriented drive roller 313A-1 to rotate, thereby causing upper belt portion 111A to move in the X-axis direction (or negative X-axis direction) at a suitable horizontal conveying speed. Stationary frame 318A is fixedly mounted adjacent to and operably disposed around upper belt portion 311A-U such that objects fed onto horizontal surface 111A are retained on horizontal surface 111A by stationary frame 318A. That is, when drive mechanism 112A causes upper belt portion 311-U to move in either the X-axis or negative-X-axis directions, this movement is transferred by frictional forces to any objects dispensed onto the upward facing surface of upper belt portion 311-U, whereby the moving objects could fall from horizontal surface 111A (e.g., by being conveyed past end portions 311A-E1 or 311A-E2). Stationary frame 318A is configured to impede the movement of such moving objects such that they remain on horizontal surface 111A. Gating mechanism 318A is configured to selectively pass portions (groups) of objects from a bulk supply (e.g., from hopper 101, shown in FIG. 1) by way of an intervening feed chute 317A onto horizontal surface 111A. In one embodiment hopper 101 is implemented using a vibratory hopper that biases objects along feed chute 317A to gating mechanism 318A.

Figure 3B:
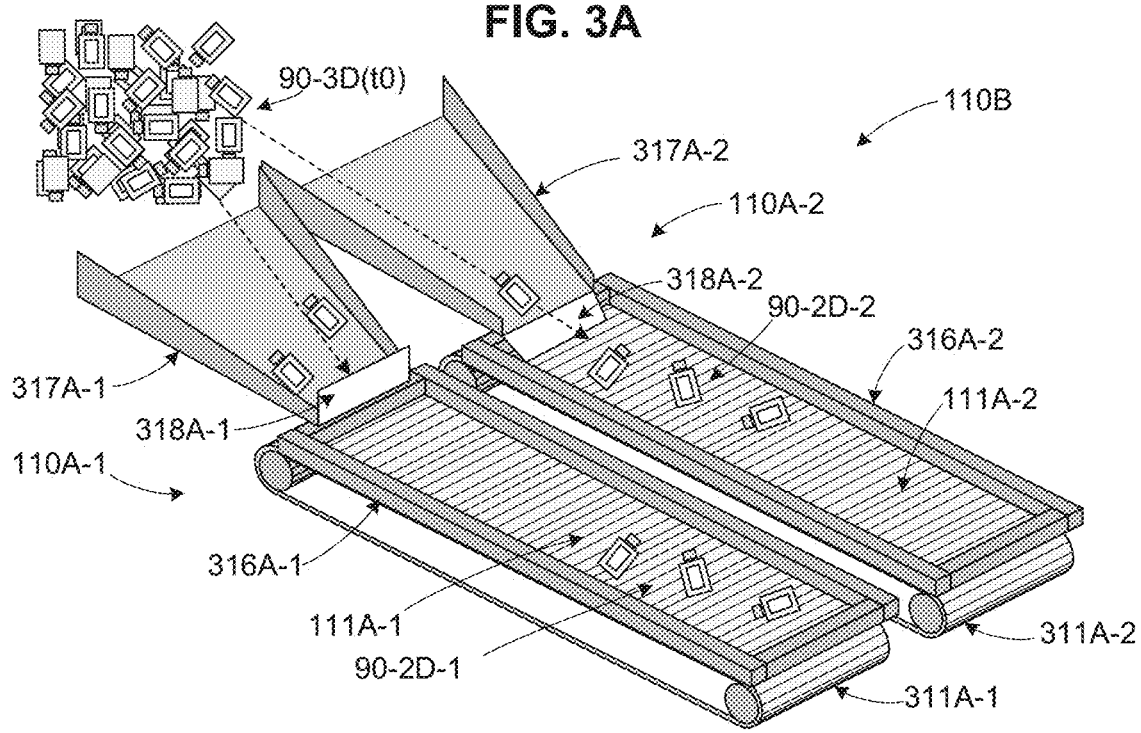

FIG. 3B depicts an object separation mechanism 110B according to a presently preferred practical embodiment including two separating units 110A-1 and 110A-2 disposed in a parallel side-by-side arrangement. Each separating unit 110A-1 and 110A-2 provides object separating mechanism 110B with an independently controlled horizontal surface portion (i.e., conveyor belt 311A-1 of separating unit 110A-1 provides a first horizontal surface portion 111A-1, and conveyor belt 311A-2 of separating unit 110A-2 provides a second horizontal surface portion 111A-2). Each separating unit 110A-1 and 110A-2 also includes the same structures and features of separation mechanism 110A (FIG. 3A) that function to generate two independently controlled 2D arrangements of containers. That is, horizontal surface portion 111A-1 of separating unit 110A-1 is surrounded by an associated stationary frame 316A-1 and periodically receives groups of containers from 3D cluster 90-3D by way of an associated gating mechanism 318A-1 and intervening feed chute 317A-1, thereby providing a first 2D arrangement 90-2D-1. Likewise, horizontal surface portion 111A-2 of separating unit 110A-2 is surrounded by stationary frame 316A-2 and includes an associated gating mechanism 318A-2 and intervening feed chute 317A-2 that communicate with the same bulk supply (i.e., 3D cluster 90-3D). Note that, in FIG. 3B, gating mechanism 318A-1 is shown in the closed (up) position that prevents new containers from sliding onto horizontal surface portion 111A-1, and gating mechanism 318A-2 is shown in the open (down) position that allows new containers to slide onto horizontal surface 111A-2 via feed chute 317A-2, thereby depicting how containers are independently selectively fed onto horizontal surface portion 111A-2 while being prevented from passing onto horizontal surface portion 111A-1. At other times gating mechanism 318A-1 is open and gating mechanism 318A-2 is closed to facilitate feeding objects onto horizontal surface portion 111A-1, and a yet other times both gating mechanisms 318A-1 and 318A-2 may be simultaneously opened or closed.

Figure 4:
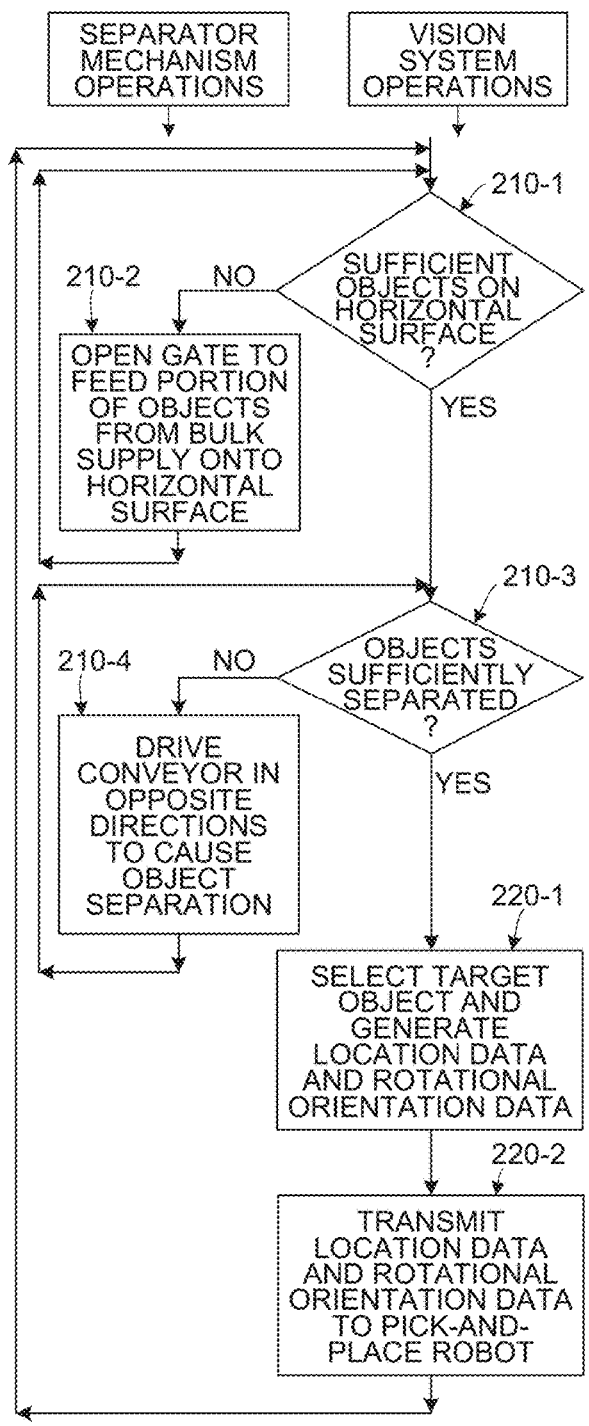
FIG. 4 is flow diagram depicting coordinated operations of a vision system and the separator mechanism of FIG. 3A during robotic work cell operations according to another exemplary embodiment.

FIG. 4 is a flow diagram depicting operations performed by object separating mechanisms similar to those described above with reference to FIGS. 3A and 3B. For brevity, the operations are described with specific reference to separating mechanism 110A and vision system 110 of FIG. 3A but may be extended to corresponding structures of FIG. 3B and to other comparable separating structures. For clarity, the operations performed by object separator 110A are generally aligned along the left side of FIG. 4, and operations/decisions performed by vision system 120A are aligned along the right side of FIG. 4. Referring to decision block 210-1, vision system 120A determines whether a number of objects currently disposed on horizontal surface 111A is sufficient (i.e., greater than a predetermined minimum number). Note that the dispensed number is reduced when selected target objects are removed for processing, so the number of objects detected by vision system 120A periodically falls below the predetermined minimum number. When this occurs (NO branch from block 210-1), control passes to block 210-2, whereby gating mechanism 318A is actuated (opened) to feed additional objects onto horizontal surface 111A. Conversely, when sufficient objects are detected (YES branch from block 210-1), control passes to decision block 210-3, whereby vision system 120A then determines whether a spacing between the previously dispensed objects 111A is insufficiently large (e.g., whether the dispensed objects are too crowded together to identify individual target objects). When this occurs (NO branch from block 210-3) control passes to block 210-4, whereby conveyor belt drive motor 312A is rapidly toggled (actuated) between opposing drive directions such that horizontal surface 111A moves back and forth (i.e., rapidly and repeatedly changes between movement in the +X direction and movement in the −X direction). The rapid back and forth movement of horizontal surface 111A is transferred by to the previously dispensed objects by way of frictional contact, thereby causing separation between the dispensed objects. When the objects are sufficiently separated (YES branch from block 210-3), control passes to block 220-1, and vision system 120A then identifies individual objects (e.g., by way of comparing the current image data CID with stored image data SID that operably describes the objects) and selects (identifies and designates) one of the stationary objects as the next target object and generates the associated location and rotational orientation data. As indicated by block 220-2, vision system 120A then transmits the location and rotational orientation data to the pick-and-place robot mechanism as described additional detail below to facilitate the pick-up/removal and transfer of the selected target object to the hand-off location.

Figure 5A:
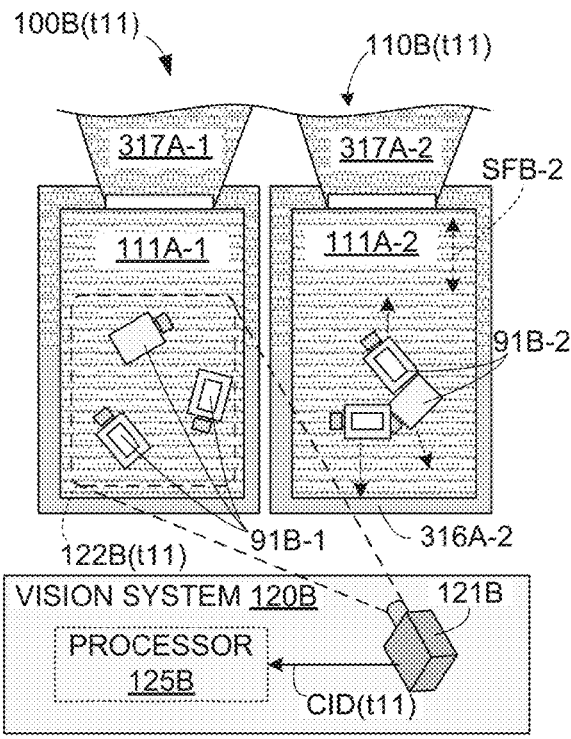
FIGS. 5A and 5B are partial top views depicting operations of the separator mechanism of FIG. 3B according to another exemplary embodiment.

FIG. 5A is a partial top view showing a robot work cell 100B including object separation mechanism 110B, which is described above with reference to FIG. 3B, and an associated vision system 120B. Although omitted for brevity and clarity, robot work cell 100B also includes the other mechanisms and features described above with reference to robot work cell 100 (FIG. 1).

Referring to the bottom of FIG. 5A, vision system 120B generally includes a camera 121B and an image processing module including a processor 125B. In one embodiment camera 121B is a commercially available digital video camera that is operably mounted over horizontal conveying surfaces 111A-1 and 111A-2 and is configured to capture and transmit current image data to image processor 125B, which is an electronic device that is configured using known hardware and/or software techniques to identify the target objects by comparing the captured current image data with stored image data that is transmitted to processor 125B from memory circuitry that is either part of the image processing module or a separate memory unit. Note that, in practical embodiments, vision systems of the type utilized by the present invention cannot accurately identify select target objects disposed on moving surfaces (i.e., selected target objects must be maintained in a stationary (non-moving) state from the time of selection to the time of pick-up by a pick-and-place robot). This means that, when a work cell utilizes an object separating mechanism having a single horizontal surface (e.g., such as mechanism 110A, shown in FIG. 3A), the vision system is unable to select target objects during periods when objects are fed onto the horizontal surface and periods when the horizontal surface is otherwise moved to separate previously dispensed objects, thereby preventing the transfer of target objects from the horizontal surface to the designated hand-off location during these periods, thus causing corresponding delays that decrease processing rates. To avoid these delays, vision system 120B is configured to alternately capture current image data and select target objects from either horizontal surface portion 111A-1 or horizontal surface portion 111A-2, for example, as described below with reference to FIGS. 5A and 5B.

Figure 5B:
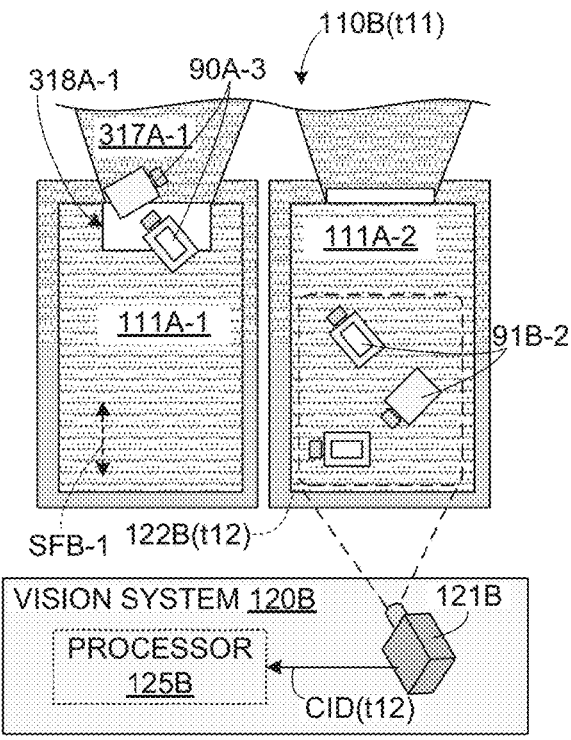

FIGS. 5A and 5B depict exemplary operations of a partial robot work cell 100B at two times during and provide an example of how parallel side-by-side separating units may be utilized to increase work cell processing rates. FIG. 5A depicts a first time period t11 when bottles/objects 91B-1 disposed on horizontal surface portion 111A-1 are stationary (i.e., the drive motor connected to conveyor belt 311A-1, shown in FIG. 3B, is deactivated such that horizontal surface portion 111A-1 does not move at time t11) and bottles 91B-2 on horizontal surface portion 111A-2 are being dynamically manipulated (i.e., the drive motor connected to conveyor belt 311A-2, shown in FIG. 3B, is activated, whereby horizontal surface portion 111A-2 and stationary frame 316A-2 produce a separating force SFB-2 intended to space bottles 91B-2 from each other). Because bottles 91B-1 are stationary and bottles 91B-2 are moving at time t11, camera 121B is utilized to capture current image data CID(t11) from horizontal surface portion 111A-1, whereby processor 125B selects a next target bottle exclusively from bottles 91B-1. In contrast, FIG. 5B depicts a second time period t12 when bottles 91B-2 disposed on horizontal surface portion 111A-2 are stationary and bottles 91B-3 on horizontal surface portion 111A-1 are being dynamically manipulated, for example, by way of opening gate 318A-1 and/or generating separating force SFB-1 in the manner mentioned above. Because bottles 91B-2 are stationary and bottles 91B-3 are moving at time t12, camera 121B is utilized to capture current image data CID(t12) from horizontal surface portion 111A-2, whereby processor 125B selects a next target bottle exclusively from bottles 91B-2. By coordinating the operations of vision system 120B with the moving/stationary states of horizontal surfaces 111A-1 and 111A-2 in the manner depicted in FIGS. 5A and 5B, robot work cell 100B achieves increased bottle/object processing rates by avoiding dynamic manipulation delays.

Figure 6:
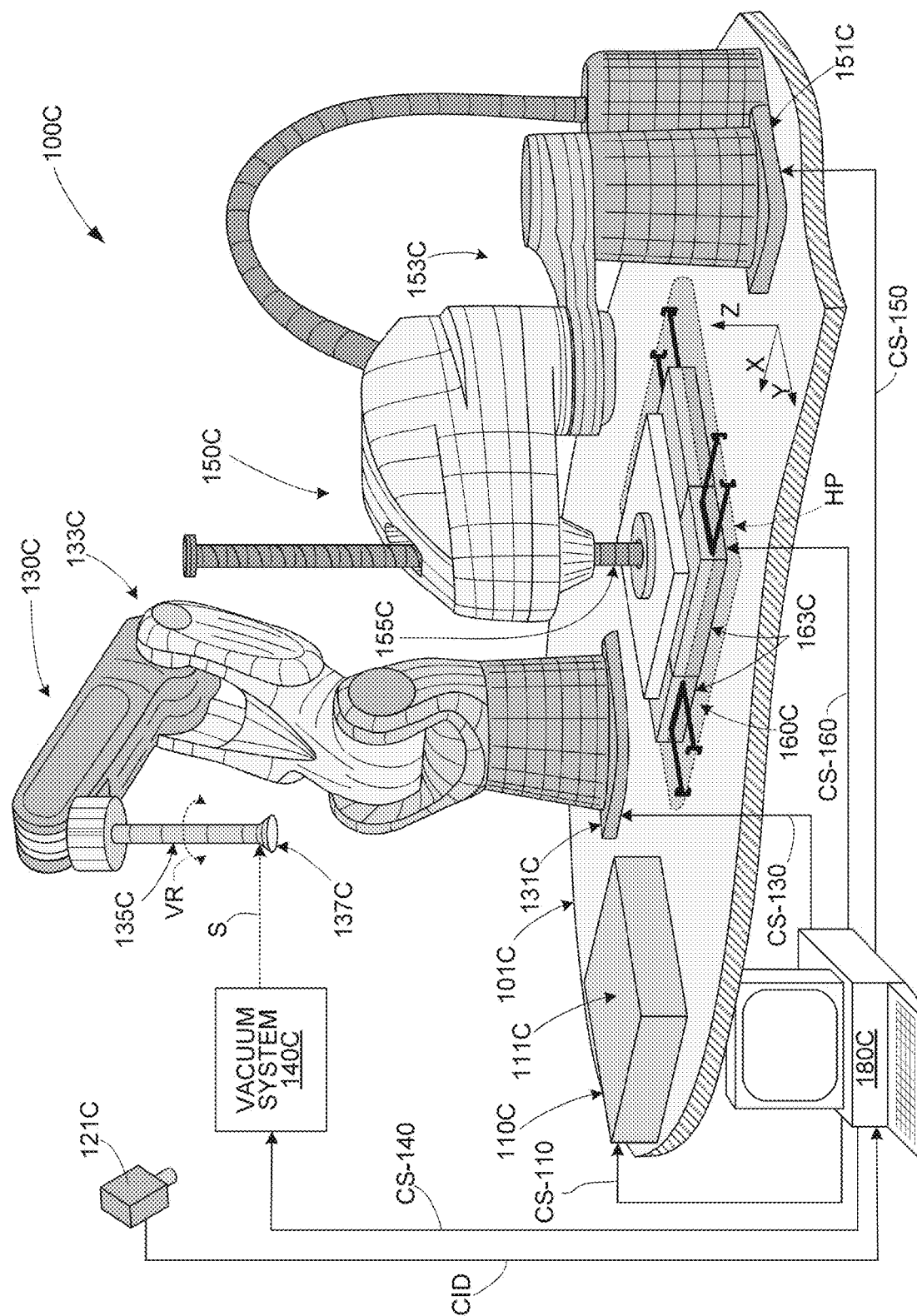
FIG. 6 is a perspective view showing a partial work cell including a pick-and-place robot mechanism and a 4-axis robot mechanism according to another exemplary embodiment.

FIG. 6 shows portions of a robotic work cell 100C according to another practical embodiment. Robotic work cell 100C includes a generalized object separating mechanism 110C, a pick-and-place robot 130C, and an object processing robot 150C that are fixedly connected to a rigid base plate 101C (e.g., a plate metal sheet). As depicted in FIG. 6, in presently preferred embodiments pick-and-place robot 130C is implemented by a six-axis robot and object processing robot 150C is implemented by a four-axis robot 150C. Robotic work cell 100C also includes a generalized carousel-type robot end-tool 160C operably connected to object processing robot 150C, power/control resources 180C and a camera 121C. Object separating mechanism 110C is configured and operates in the accordance with any of the embodiments described above.

Six-axis (pick-and-place) robot 130C includes a base portion 131C connected to an upper surface of rigid base plate 101C, a multi-section arm portion 133C extending from base portion 131C, and a distal end portion 135C disposed at a free (distal) end of arm portion 133C. In a presently preferred embodiment, six-axis robot 130C is implemented using a mini six-axis robot (e.g., model LR Mate 200iD provided by Fanuc America Corporation of Rochester Hills, MI, USA), and includes a suction cup 137C operably connected to distal end portion 135C and controlled by a vacuum system 140C, which supplies suction (vacuum) force S to suction cup 137C during periods described below with reference to FIG. 7 to facilitate the pick-and-place operations described herein. In some embodiments vacuum system 140C is integrated into six-axis robot 130C using known techniques, and in other embodiments vacuum system 140C may be a stand-alone system. Mini six-axis robots of this type have the approximate size and reach of a human arm and facilitate reliable pick-and-place and hand-off operations that may be utilized for a wide range of object types and sizes. In some embodiments a less-expensive four-axis robot, such as that described below with reference to robot 150C, may be utilized to implement pick-and-place operations (i.e., in place of six-axis robot 130C).

Four-axis robot 150C is operably secured to rigid base plate 101C at a location adjacent to six-axis robot 130C and includes a base portion 151C, a jointed two-link arm portion 153C connected at its fixed end to base portion 151C, and an end-shaft 155C that is connected to a distal end of arm portion 153C. In the presently preferred embodiment, four-axis robot 150C is implemented by a Selective Compliance Assembly Robot Arm (SCARA) robot (e.g., model SCARA SR-3iA provided by Fanuc America Corporation). SCARA robots are characterized in that the two arm sections are connected by a parallel-axis joint layout that allows arm portion 153C to move in the horizontal (X-Y) direction but remains rigid (fixed) in the vertical (Z-axis) direction. Conversely, end-shaft 155C is controllable to move along and rotate around the vertical Z-axis (first) direction relative to arm portion 153C but cannot move in the horizontal (X-Y) direction relative to arm portion 153C. Accordingly, by connecting robotic end-tool 160C to end-shaft 155C in the horizontal orientation described herein, all four gripper mechanisms 163C of robotic end-tool 160C are disposed in a horizontal (X-Y) plane (i.e., a plane perpendicular to the Z-axis defined by end-shaft 155C) and remain within plane HP during the processing operations described herein.

Shared power/control resources (control unit) 180C, which is depicted as a computer for brevity, is configured using known techniques to manage power distribution and to coordinate the various operations that achieve the desired bulk bottle (or other object) processing described herein. That is, control unit 180C is configured to generate and transmit control signals to the various robots, systems and mechanisms of robotic work cell 100C. In one embodiment control unit 180C implements portions of a vision system of robotic work cell 100C (i.e., instead of using a stand-along processing unit, control unit 180C processes current image data CID received from a remote digital camera 121C to select and generate location and rotational orientation data for target bottles disposed on a horizontal surface 111C of object separating mechanism 110C), and control unit 180C is also configured to transmit corresponding control signals CS-130 (including location and rotational orientation data) to six-axis robot 130C. In a similar manner, control unit 180C is configured to generate and transmit control signals CS-110 to control dynamic manipulation operations performed by object separating mechanism 110C, control signals CS-140 to activate/deactivate vacuum system 140C in order to selectively generate suction force in suction cup 137C, control signals CS-150 to control X-axis, Y-axis and Z-axis movements and rotations of robotic end-tool 160C by four-axis robot 150C, and control signals CS-160 to control the various gripper operations described herein. As depicted in FIG. 6, in one embodiment control unit 180C is disposed below base plate 101C and transmits/receives the various signals by way of associated wires.

Figure 7:
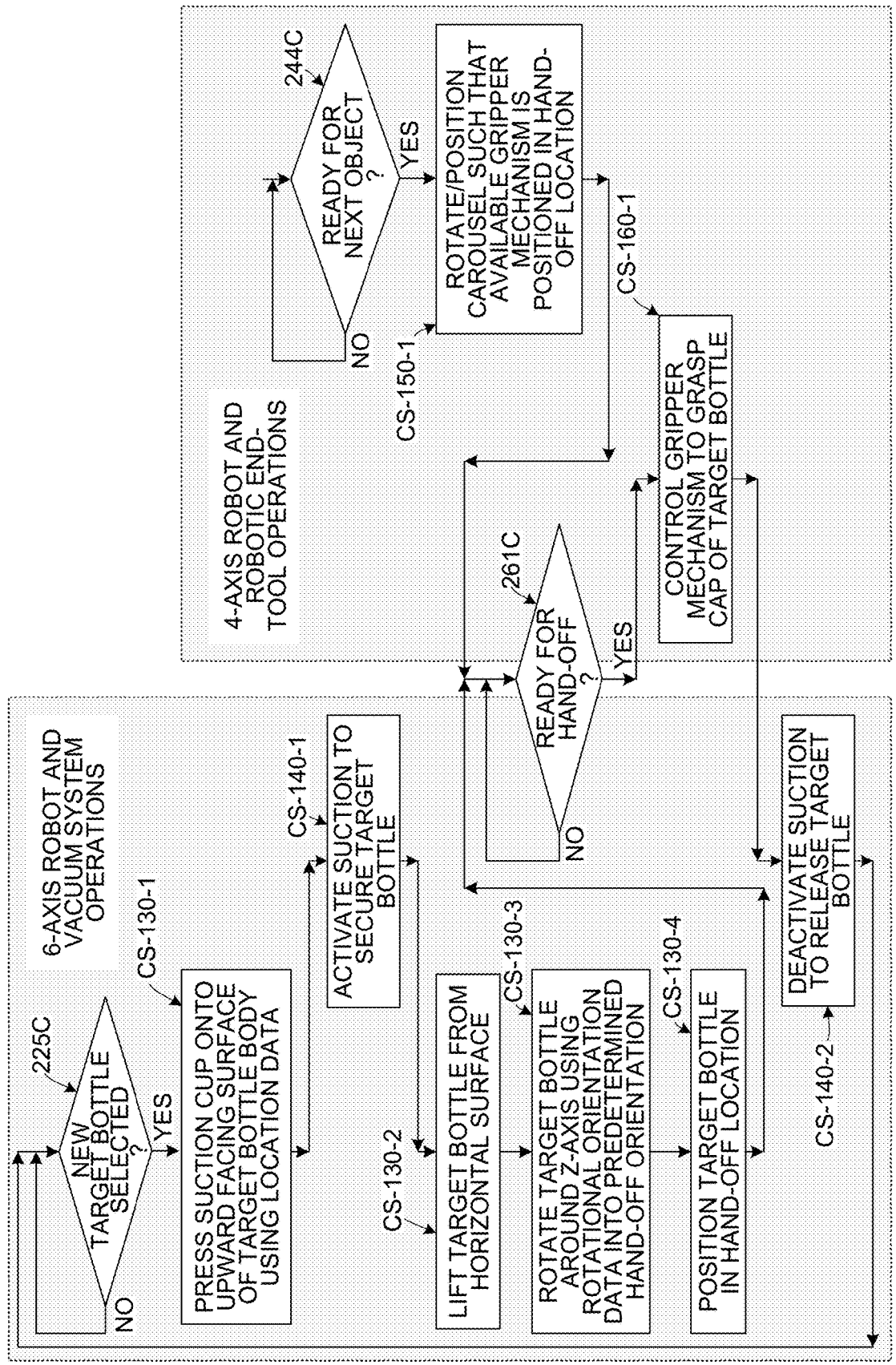
FIG. 7 is flow diagram depicting coordinated operations of the pick-and-place and 4-axis robot mechanisms of FIG. 6 during robotic work cell operations according to another exemplary embodiment.

FIG. 7 is a flow diagram depicting an exemplary hand-off operation performed by robotic work cell 100C (described above with reference to FIG. 6) and involving a bottle-type target object (target bottle) according to another exemplary embodiment. That is, the flow diagram includes decision blocks and control signal/operation blocks that produce coordinated operations of six-axis robot 130C, vacuum system 140C, four-axis robot 150C and robotic end-tool 160C (FIG. 6) during transfer of bottle-type structure that has the features of bottle 91, which is shown at the top of FIG. 1. In the present embodiment all decision blocks and control signal blocks are executed, generated and/or transmitted by control unit 180C (shown in FIG. 6). Note that operations performed by six-axis robot 130C and vacuum system 140C to secure and transfer the target bottle to a designated hand-off location are executed in accordance with control signals described by the blocks shown in the left side of FIG. 7, and that operations performed by four-axis robot 150C and robotic end-tool 160C to position a next-available gripper mechanism and to take possession of the target bottle are executed in accordance with control signals described by the blocks are shown in the right side of FIG. 7. Although the operations performed by six-axis robot 130C and vacuum system 140C are described below before the operations performed by four-axis robot 150C and robotic end-tool 160C, the two sets of operations may be performed in the opposite order or simultaneously.

Referring to left side of FIG. 7 (and referencing structures shown in FIG. 6), when a new target bottle is selected (YES branch from decision block 225C), control unit 180C transmits a first six-axis robot control signal CS-130-1 that includes location data and associated commands that cause six-axis robot 130C to press suction cup 137C onto an upward facing surface of the target bottle's container body, and then transmits a first vacuum system control signal CS-140-1 that causes vacuum system 140C to transmit suction force S to suction cup 137C such that low (vacuum) pressure inside suction cup 137C secures the target bottle's container body to suction cup 137C. Control unit 180C transmits a second six-axis robot control signal CS-130-2 that causes six-axis robot 130C to move the target bottle toward the designated hand-off location, which begins by lifting the target bottle from horizontal surface 111C. Control unit 180C transmits a third six-axis robot control signal CS-130-3 that includes rotational orientation data for the target bottle, and causes six-axis robot 130C to rotate distal end portion 135C around its axis (i.e., as indicated by dashed-line arrow VR in FIG. 6) by an amount such that the target bottle is oriented with its cylindrical neck structure pointing in a predetermined direction (e.g., toward robotic end-tool 160C) when six-axis robot 130C moves the target bottle into the designated hand-off location. Control unit 180C then transmits an optional fourth six-axis robot control signal CS-130-4 that causes six-axis robot 130C to complete the transfer/positioning of the target bottle in the hand-off location, and six-axis robot 130C optionally notifies control unit 180C that the target bottle is ready for hand-off. Note that vacuum system 140C maintains the transmission of suction force S to suction cup 137C, whereby the target bottle remains securely attached to six-axis robot 130C.

Referring to right side of FIG. 7 (and referencing structures shown in FIG. 6), when control unit 180C determines that a gripper mechanism of robotic end-tool 160C is available to take possession of a new target bottle (YES branch from decision block 244C), control unit 180C transmits a four-axis robot control signal CS-150-1 that causes four-axis robot 150C to rotate and otherwise position robotic end-tool 160C such that the available gripper mechanism is operably positioned in the designated hand-off location, and then four-axis robot 150C optionally notifies control unit 180C that the available gripper mechanism is in position to take possession of the target bottle (i.e., ready for hand-off).

Referring to the lower central portion of FIG. 7, when control unit 180C determines that both the target bottle and the gripper mechanism are in the hand-off location (i.e., ready for hand-off; YES branch from decision block 261C), control unit 180C transmits an end-tool control signal CS-160-1 that the available gripper mechanism to grasp the cylindrical cap structure of the target bottle (i.e., such that the gripper mechanism presses its opposing gripper structures against opposite side surfaces of the cylindrical cap structure). Control unit 180C then transmits a second vacuum system control signal CS-140-2 that causes vacuum system 140C to terminate transmission of suction force S to suction cup 137C, whereby the target bottle is released from suction cup 137C and solely held by the gripper mechanism of robotic end-tool 160C, thus completing the exemplary hand-off operation. From this point the target bottle is moved by robotic end-tool 160C from the hand-off location to the designated processing location in the manner described in detail below, and control unit 180C causes six-axis robot 130C to prepare to transfer a next-selected target bottle.

FIGS. 8A to 8D depict a gripper assembly 800D that is utilized by carousel-type robotic end-tool 160D (described below with reference to FIG. 9) to facilitate the selectively rotation of gripper mechanisms around horizontal axes. Note that FIGS. 8A to 8D depict gripper assembly 800D during various sequential assembly stages to clearly illustrate mechanical connections of its various components, and that some components may be omitted from each given figure for brevity and clarity.

Referring to FIG. 8A, gripper assembly 800D is similar to configurations used in previous embodiments in that gripper mechanism 163D is connected to a central hub fixture 161D such that an associated mounting flange 162D extends in a corresponding horizontal (first) axial direction H1. Gripper assembly 800D is distinguished from earlier embodiments in that gripper mechanism 163D is rotatably connected to associated mounting flange 162D in the manner described below such that gripper mechanism 163D is rotatable around a corresponding horizontal (second) axial direction H2 that is perpendicular to direction H1. Note that central hub fixture 161D is oriented such that its cylindrical central opening 801D is aligned in a vertical (Z-axis) direction, and such that its disk-shaped body lies in a horizontal plane (e.g., as defined by the indicated X- and Y-axes). This orientation is generated when mounted to the end-shaft of a four-axis robot in the manner described herein. Note that gripper mechanism 163D is also disposed in a horizontal (X-Y) plane with three other gripper mechanisms as described below with reference to FIG. 9, and that horizontal direction H2 generally lies within this horizontal plane. The horizontal plane occupied by gripper mechanism 163D is parallel to but slightly below the horizontal plane occupied by central hub fixture 161D.

Figure 8C:
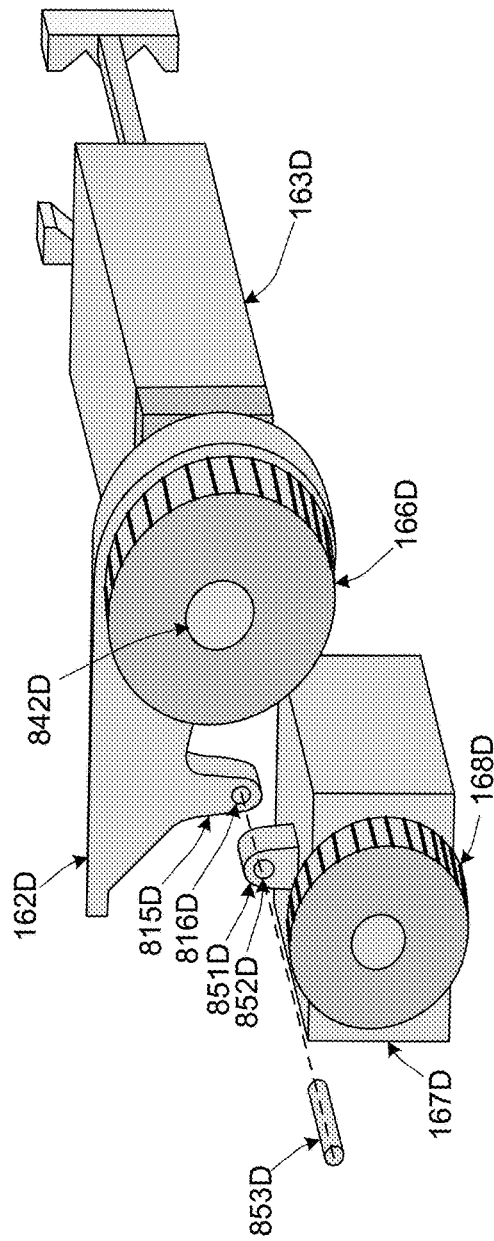

As indicated in FIGS. 8A to 8C, gripper assembly 800D includes a mounting flange 162D, a rolling-element bearing 165D, a drive motor 167D and a drive train formed by a drive axle 842D, a (first) circular belt guide 166D, a (second) circular belt guide 168D and a drive belt described below with reference to FIG. 8D. Mounting flange 162D is an integral machined or stamped metal structure having a fixed (first) end 811D and a body portion 812D. Fixed end 811D is configured for fixed connection to central hub fixture 161D (e.g., as described below with reference to FIG. 8D). Body portion 812D includes a bearing ring structure 813D located at a distal end of mounting flange 162D, and a motor mount structure 815D protruding from body portion 812D between bearing ring structure 813D and fixed end 811D. Bearing ring structure 813D defines a circular bearing opening 814D that is configured to receive rolling-element bearing 165D, and motor mount structure 815D defines at least one mounting hole 816D that is used as described below to connect drive motor 167D to mounting flange 162D. Rolling-element bearing 165D includes a first (inner race) portion 831D and a second (outer race) portion 832D that are rotatably connected using known techniques. As indicated in FIG. 8B, inner race 831D is fixedly connected to gripper mechanism 163D by way of axle 842D and connecting structure 821D, and outer race portion 832D is disposed in bearing opening 814D and fixedly connected to the bearing ring structure 813D. Drive axle 842D is a cylindrical metal structure that defines horizontal axis H2 and has opposing first and second ends 842D-1 and 842D-2. As indicated in FIG. 8B, in one embodiment first end 842D-1 extends through rolling-element bearing 165D and is inserted into a receiving hole 823D defined by a connecting structure 821D, which is fixedly connected to a rear end of gripper mechanism 163D. As also indicated in FIG. 8B, circular belt drive 166D is fixedly connected to second (opposing) end 842D-2 of drive shaft 842D. Referring to FIG. 8C, drive motor 167D is an electric motor that is configured to selectively apply a driving force to circular belt drive 168D by way of a motor drive shaft 861D. Drive motor 167D is disposed in a housing that includes a mounting flange 851D defining a connecting hole 852D and is connected to motor mount structure 815D of mounting flange 162D by way of connecting pin 853D (e.g., as indicated by the dashed line in FIG. 8A and depicted in FIG. 8C).

Figure 8D:
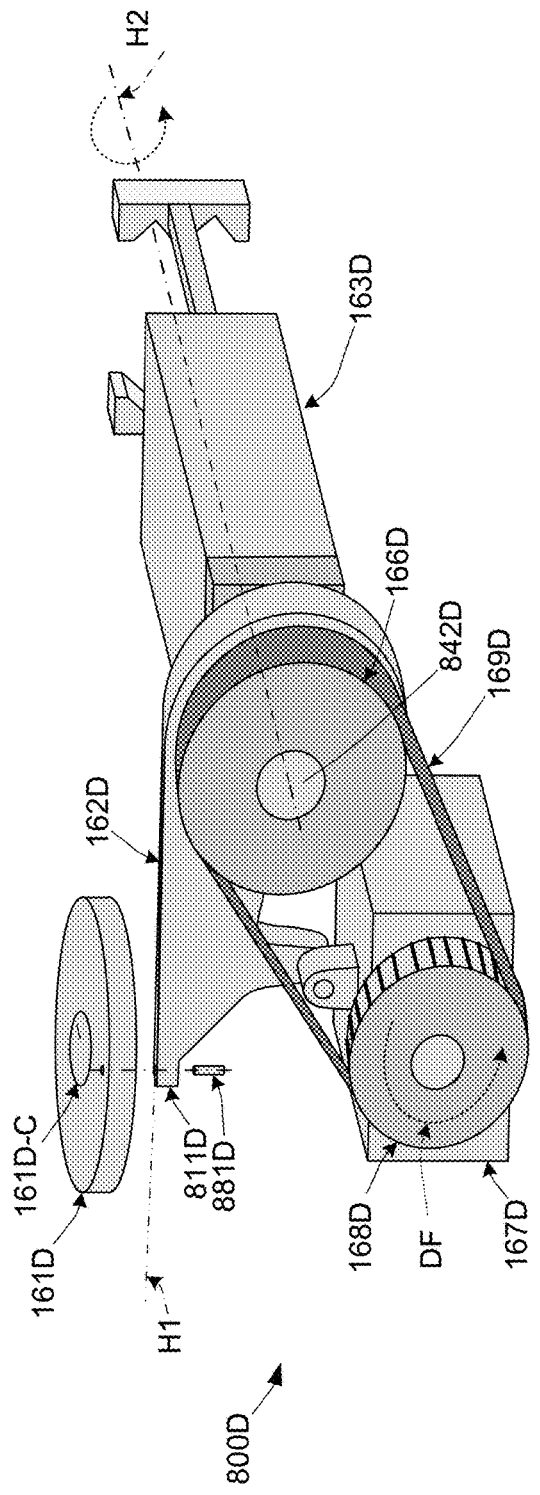

FIG. 8D shows gripper assembly 800D after gripper mechanism 163D and drive motor 167D are connected to mounting flange 162D as described above, and a drive belt 169D is operably trained between circular belt guides 166D and 168D. With this arrangement, drive force DF generated by drive motor 167 causes rotation of circular belt guide 168D, which is transferred by drive belt 169D to cause an associated rotation of circular belt guide 166D, thereby causing rotation of gripper mechanism 163D by way of drive axle 842D around horizontal axis H2, which extends parallel to the depicted Y-axis. As also shown in FIG. 8D, assembly 800D is fixedly connected to central hub fixture 161D by way of connecting fixed end portion 811D of mounting flange 162D with body portion 812D of mounting flange 162D, e.g., by way of a connecting pin/fastener 881D. When connected, mounting flange 162D extends away from central hub fixture 161D in a +X horizontal direction H1 (i.e., perpendicular to horizontal axis H2).

Figure 9:
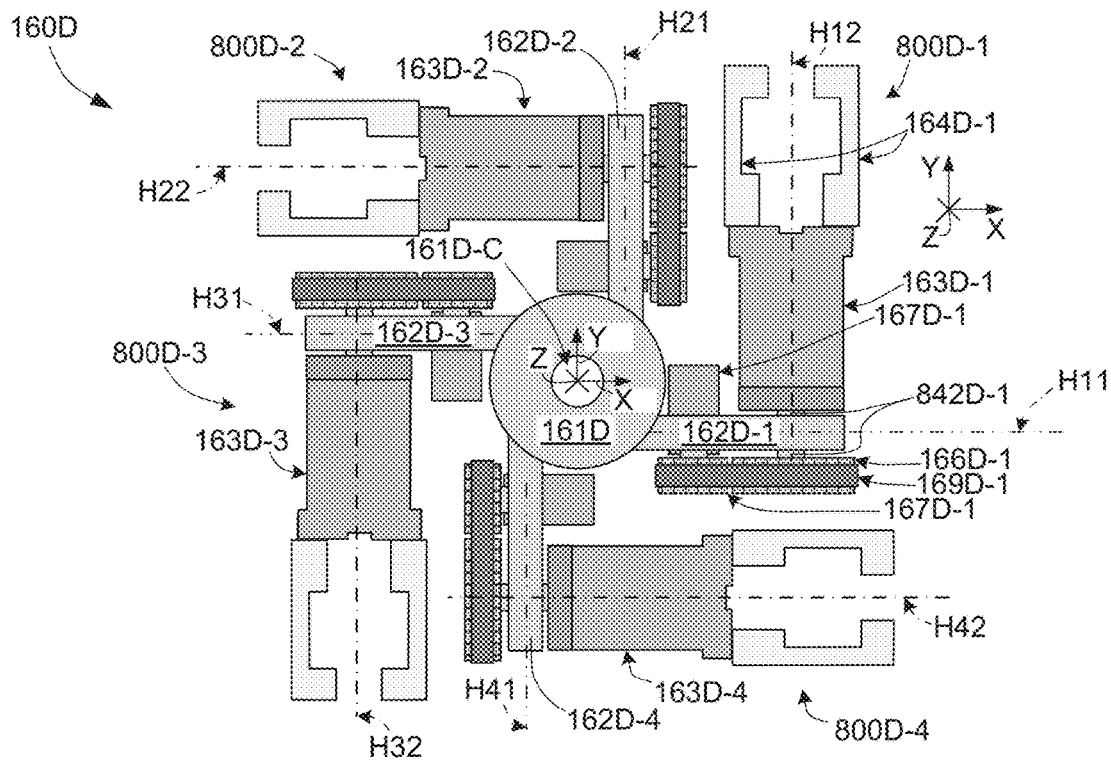
FIG. 9 is a top plan view showing a carousel-type robotic end-tool including four gripper assemblies of the type depicted in FIG. 8D according to another exemplary embodiment.

FIG. 9 is a top view showing a robotic end-tool 160D according to another specific embodiment in which four gripper mechanisms 163D-1 to 163D-4 are connected to central hub fixture 161D by way of four gripper assemblies 800D-1 to 800D-4 such that each gripper mechanisms 163D-1 to 163D-4 is selectively rotatable around an associated horizontal axis. Gripper mechanisms 163D-1 to 163D-4 collectively lie in a horizontal plane like plane HP described above with reference to FIG. 6. Note that each gripper assembly 800D-1 to 800D-4 is constructed and operates in the manner described above with reference to FIGS. 8A to 8D such that gripper mechanisms 163D-1 to 163D-4 rotate around four different horizontal axes. For example, gripper assembly 800D-1 includes a mounting flange 162D-1 that extends from central hub structure 161D in a +X horizontal direction H11, and gripper mechanism 163D-1 is rotatably connected to mounting flange 162D-1 by way of a bearing (not shown) such that opposing gripper structures 164D-1 extend in a +Y-axis direction and such that gripper mechanism 163D-1 is rotatable around a horizontal axis H12 in response to a drive force generated by associated drive motor 167D-1. Note that the drive force generated by drive motor 167D-1 is transferred to gripper mechanism 163D-1 by way of an intervening drive train including circular belt guides 166D-1 and 168D-1, a drive belt 169D-1, and drive axle 842D-1, which is operably connected to gripper mechanism 163D-1 as described above with reference to drive assembly 800D. Similarly, gripper assembly 800D-2 includes a mounting flange 162D-2 that extends from central hub structure 161D in a +Y horizontal direction H21 with gripper mechanism 163D-2 extending in a negative-X-axis (−X) direction and being rotatable around horizontal axis H22, gripper assembly 800D-3 includes a mounting flange 162D-3 extending in a −X horizontal direction H31 with gripper mechanism 163D-3 extending in a negative-Y-axis (−Y) direction and being rotatable around horizontal axis H32, and gripper assembly 800D-4 includes a mounting flange 162D-4 extending in a −Y horizontal direction H41 with gripper mechanism 163D-4 extending in a +X-axis direction and being rotatable around horizontal axis H42. Note that gripper assemblies 800D-1 to 800D-4 maintain gripper mechanisms 163D-1 to 163D-4 in a horizontal (X-Y) plane when central hub opening 161D-C of central hub fixture 161D is aligned in a vertical (Z-axis) direction, as indicated in FIG. 9.

Figures 10A, 10B, 10C:
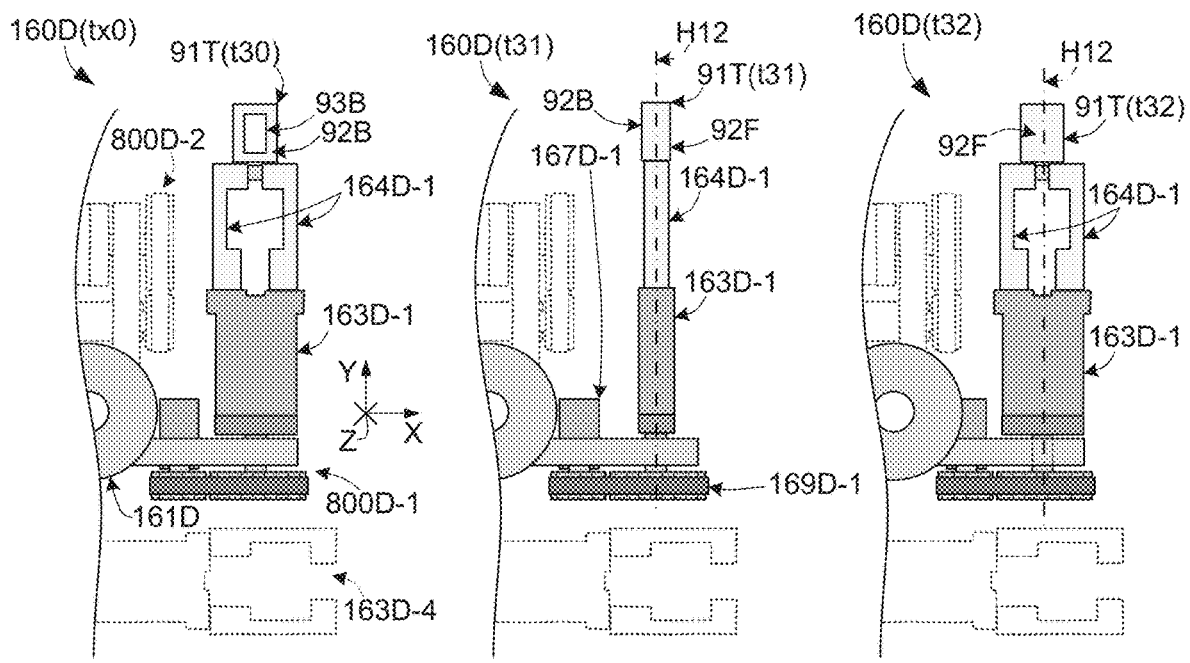
FIGS. 10A, 10B and 10C are partial top views showing a portion of the robotic end-tool of FIG. 9 during robotic work cell operations according to another exemplary embodiment.

FIGS. 10A to 10C are partial top views depicting a portion of carousel-type robotic end-tool 160D including gripper mechanism 163D-1, with portions of gripper assembly 800D-2 and gripper mechanism 163D-4 shown in dashed lines for reference. Gripper mechanism 163D-1 is connected to central hub fixture 161D in the manner described above with reference to FIG. 9. As mentioned above with reference to FIG. 1, the exemplary work cell application involves placing brand labels on promotional hand sanitizer bottles, with such bottles typically being provided with a content label 93B adhered to a rear (backside) surface 92B of each container body 92, and the work cell's designated process involves applying a brand/logo label to frontside surface of each bottle's container body. In this context, when a target bottle is transferred in a wrong-side-up orientation, the bottle must be inverted before a brand/logo label can be applied to the container's frontside surface. FIGS. 10A to 10C specifically illustrate how a selective 180° rotation of gripper mechanism 163D-1 by way of gripper assembly 800D-1 facilitates inverting (flipping over) a target bottle 91T from the problematic backside-up orientation to the desired frontside-up orientation prior to being transferred to the designated processing location.

FIG. 10A depicts end-tool 160D at a time t30 immediately after a pick-and-place robot (not shown) has transferred a target bottle 91T(t30) to gripper mechanism 163D-1 in a wrong-side-up orientation (i.e., with backside surface 92B facing upward). In one embodiment the backside-up orientation of target bottle 91T(t30) is determined by the vision system (not shown) prior to transfer by the pick-and-place robot, and a control signal that causes gripper assembly 800D-1 to invert target bottle 91T(t30) is transmitted from a control unit after target bottle 91T(t30) has been grasped by gripper structures 164D-1 (i.e., after hand-off of target bottle 91T(t30) from the associated pick-and-place robot has been completed). In other embodiments the wrong-side-up orientation of target bottle 91T(t30) may be determined using other sensing devices/systems. FIG. 10B depicts end-tool 160D at a time t31 while gripper assembly 800D-1 is rotating gripper mechanism 163D-1 around horizontal axis H12. Specifically, FIG. 10B depicts target bottle 91T(t31) after a rotational drive force generated by drive motor 167D-1 has been transferred by drive belt 169D-1 as described above to rotate gripper mechanism 163D-1 by 90° from the orientation shown in FIG. 10A (e.g., such that frontside surface 92F of target bottle 91T(t31) faces right and backside surface 92B of target bottle 91T(t31) faces left. FIG. 10C depicts end-tool 160D at a time t32 after the desired 180° rotation of gripper mechanism 163D-1 around horizontal axis H12 has been completed, thereby successfully inverting target bottle 91T(t32) such that frontside surface 92F faces upward. Note that the inversion process depicted in FIGS. 10A to 10C is selective in the context of applying brand/logo labels to container frontside surfaces because inversion is not required when target bottles are transferred to the gripper mechanisms in a frontside-up orientation. However, robotic end-tool 160D may be implemented to rotate every target bottle in other processing contexts, for example, to facilitate processing on opposing front/back bottle surfaces.

Figure 11A:
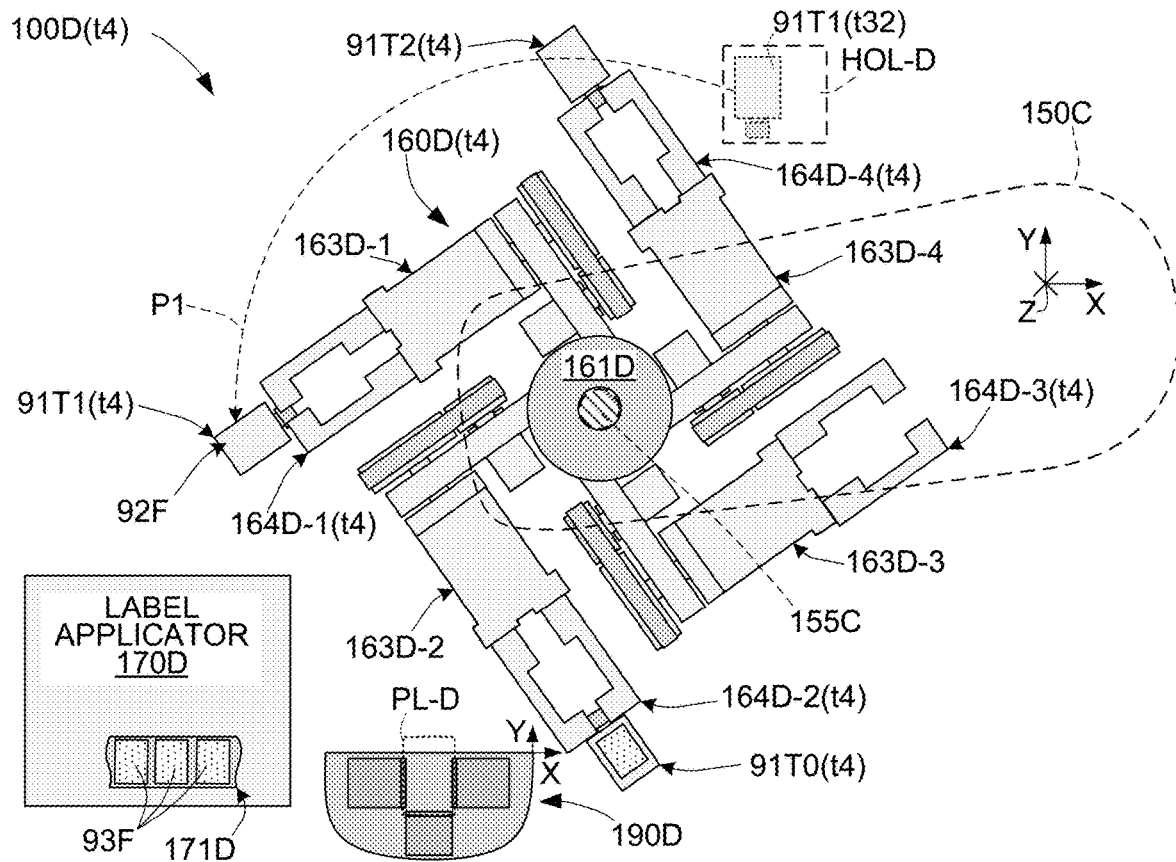
FIGS. 11A and 11B are simplified partial top views depicting coordinated operations of the 4-axis robot mechanism of FIG. 6 and the robotic end-tool of FIG. 9 during robotic work cell operations according to another exemplary embodiment.
Figure 11B:
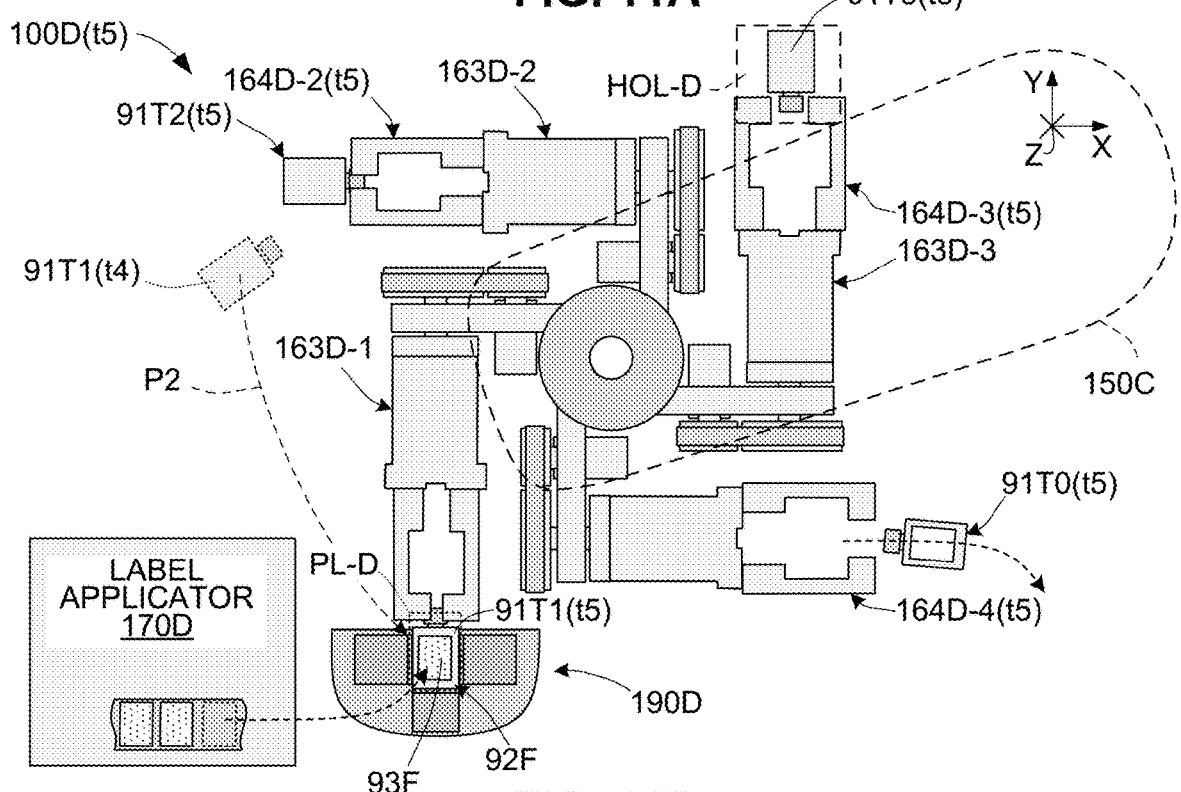

FIGS. 11A and 11B are partial top views depicting a robotic work cell 100D, which includes carousel-type robotic end-tool 160D, four-axis robot 150C, and a simplified label applicator (processing device) 170D. Four-axis robot 150C is configured and operates as described above with reference to FIG. 6 and is partially depicted in hidden form for illustrative purposes. Robotic end-tool 160D is configured and operates as described above with reference to FIGS. 9, 10A and 10B, and is operably connected to end-shaft 155C (i.e., in place of end-tool 160C, shown in FIG. 6). Label applicator 170D, which is depicted in a simplified form for clarity and brevity, is configured to transfer brand/logo labels 93F from a supply strip 171D onto target bottles disposed in process location PL-D (e.g., as indicated in FIG. 11B) using known techniques. Other mechanisms, systems and devices forming robotic work cell 100D are omitted from FIGS. 11A and 11B for brevity and clarity.

FIGS. 11A and 11B show robotic end-tool 160D after time t32 (i.e., after target bottle 91T1 has been rotated frontside-up in the manner described above with reference to FIGS. 10A-10C). Specifically, FIG. 11A shows robotic work cell 100D after four-axis robot 150C has rotated robotic end-tool 160D counterclockwise by the amount indicated by dashed-line arrow P1 between time t32 and time t4 (i.e., such that target bottle 91T1(t4) is approaching processing location PL-D at time t4), and FIG. 11B depicts the further rotation of robotic end-tool 160D such that target bottle 91T1(t5) is located in processing location PL-D at time t5. As mentioned above, the rotation of robotic end-tool 160D is achieved by way of controlling four-axis robot 150C to rotate end-shaft 155C around its vertical Z-axis, whereby the fixed connection between end-shaft 155C and central hub fixture 161D causes carousel-type robotic end-tool 160D to rotate by a corresponding amount. Note that processing location PL-D is located on/over a positioning structure 190D, which is used to precisely position bottle-type target objects as described in detail below with reference to FIGS. 12A to 12C.

FIGS. 11A and 11B depict a key advantage of the present invention: that is, the use of the carousel-type end-tools described herein facilitates the simultaneous transfer of multiple sequentially selected target objects in a way that facilitates the desired bulk object processing in a minimum amount of time and with minimal wear and tear on four-axis robot 150C. That is, referring to FIG. 11A, at time t4 robotic end-tool 160D simultaneously holds three sequentially selected target objects: a first target bottle 91T0 is held between gripper structures 164D-2 of gripper mechanism 163D-2, a second target bottle 91T1 held by gripper structures 164D-1 of gripper mechanism 163D-1, and a third target bottle 91T2 is held between gripper structures 164D-3 of gripper mechanism 163D-3. Target bottles 91T0, 91T1 and 91T2 represent three sequentially selected target objects that underwent transfer from the object separation mechanism (not shown) using the pick-and-place robot (also not shown) of robotic work cell 100D in the manner described above. Target bottle 91T0 was the first target bottle of this group to be selected and transferred by the pick-and-place robot to gripper mechanism 163D-2, and at time t4 is fully processed and ready to be released from gripper structures 164D-2. Target bottle 91T1 was the second target bottle of this group to be selected/transferred to gripper mechanism 163D-1, and at time t4 is moving toward processing location PL-D. Target object 91T2 was the last sequential target bottle of this group to be selected/transferred to gripper mechanism 163D-4. Note that, although gripper structures 164D-3(t4) of gripper mechanism 163D-3(t4) do not hold a previously selected target bottle at time t4, rotation of end-tool 160D(t4) by pick-and-place robot 150C moves gripper structures 164D-3(t4) toward hand-off location HOL-D at time t4, and at time t5 (shown in FIG. 11B) gripper mechanism 163D-3 operably positions gripper structures 164D-3 to receive a fourth target bottle 91T3(t5). Similarly, indicated in FIG. 11B, at time t5 fully processed target bottle 91T0(t5) is released (i.e., by controlling gripper mechanism 163D-2 to open gripper structures 164D-2), whereby gripper mechanism 163D-2 becomes available to grasp a next sequential target bottle transferred to hand-off location HOL-D. This processing cycle substantially reduces the distance that would be traveled by end-shaft 155C if four-axis robot 150C included a conventional single-object end-tool (i.e., if the end-tool was required to move the entire distance between the hand-off location and the processing location for every target bottle/object transferred to it from a pick-and-place robot).

Figure 12A:
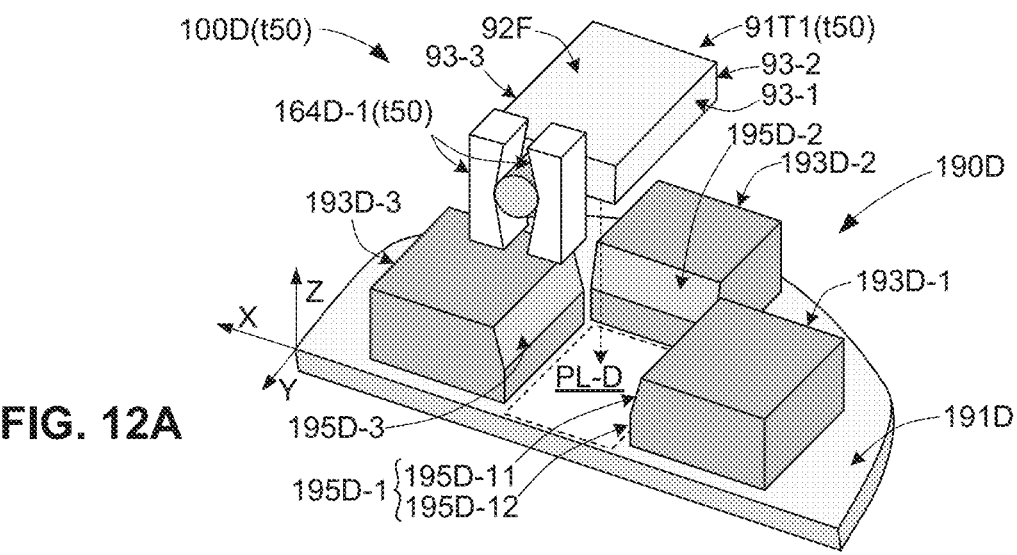
FIGS. 12A, 12B and 12C are perspective views depicting a positioning structure utilized to achieve the precise positioning of a target object in a designated processing location according to another exemplary embodiment.
Figure 12B:
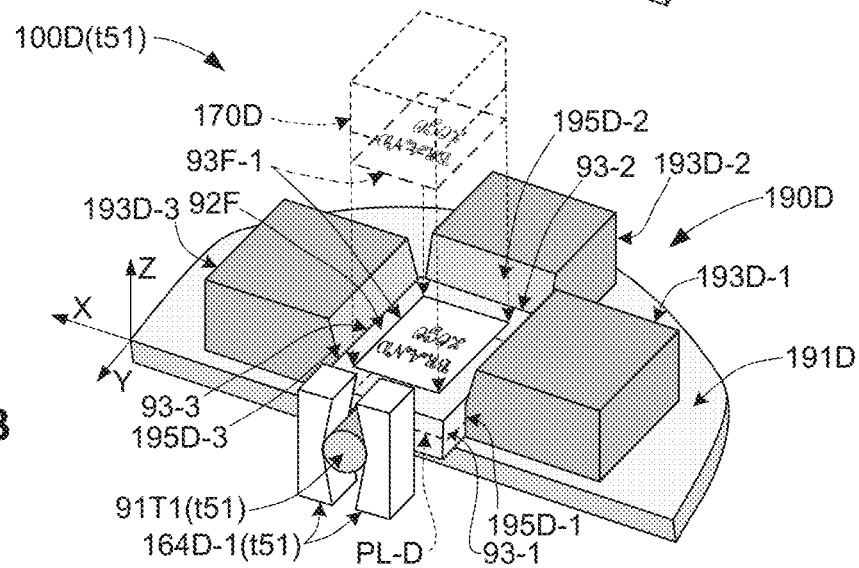
Figure 12C:
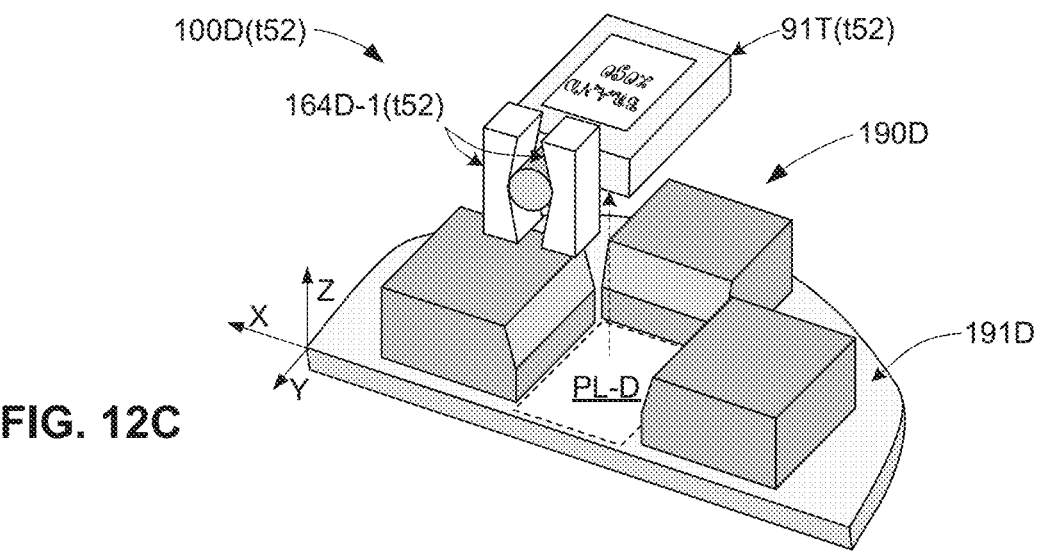

FIGS. 12A to 12C show positioning structure 190D of robotic work cell 100D (FIGS. 11A and 11B) in additional detail, and illustrate how robotic work cell 100D utilizes positioning structure 190D to precisely position target bottle 91T in designated processing location PL-D.

Referring to FIG. 12A, positioning structure 190D includes a base structure 191D and three positioning blocks 193D-1, 193D-2 and 193D-3 that are disposed around and effectively define designated processing location PL-D. Each positioning block includes a lower surface that is operably connected to an upper surface of base structure 191D and is arranged such that a beveled side surface faces toward designated processing location PL-D. Specifically, positioning block 193D-1 is arranged such that its beveled side surface 193D-1 faces in the X-axis direction toward designated processing location PL-D, positioning block 193D-2 is arranged such that its beveled side surface 193D-2 faces in the Y-axis direction, and positioning block 193D-3 is arranged such that its beveled side surface 193D-3 faces in negative X-axis direction. In one embodiment each beveled side surface includes an upper less-steep section and a lower steeper (or vertical) section. For example, beveled side surface 193D-1 includes a lower section 195D-12 that is substantially vertical, and an upper section that extends at an acute angle relative to vertical. In a preferred embodiment, positioning blocks 193D-1, 193D-2 and 193D-3 are adjustably connected to base structure 191D to facilitate optimal positioning of bottles (or other objects) having different sizes and shapes (i.e., such that the X-axis spacing between positioning blocks 193D-1 and 193D-3 can be selectively enlarged or reduced, and such that the location of positioning block 193D-2 may be selectively adjusted in the Y-axis direction). In some embodiments base structure 191D is attached to an underlying base plate (e.g., as described below with reference to FIG. 13), and in other embodiments base structure 191D may be omitted and the positioning blocks attached directly to the underlying base plate.

FIGS. 12A to 12C also show how positioning structure 190D facilitates the precise positioning of containers in designated processing location PL-D by way of controlling 4-axis robot mechanism 150C to move carousel-type robotic end-tool 160D in vertical directions. That is, FIGS. 12A to 12C only show a portion of robotic work cell 100D that includes positioning structure 190D and only the endmost tip portions of opposing gripper structures 164D-1, and that the depicted movements of container 91T are transmitted from 4-axis robot mechanism 150C and robotic end-tool 160D by way of gripper structures 164D-1. That is, the vertical movements of container 91T depicted in FIGS. 12A-12D are generated by operations of 4-axis robot mechanism 150C to move robotic end-tool 160D in the vertical (Z-axis) direction in the manner described above.

FIG. 12A shows robotic work cell 100D at time t50, when four-axis robot mechanism 150C positions robotic end-tool 160D such that gripper structures 166D position target bottle 91T1 over designated processing location PL-D. Specifically, target bottle 91T1(t50) is positioned over positioning structure 190D such that side edges 93-1 and 93-3 of container 91T1(t50) are generally aligned with beveled edges 195D-1 and 195D-3 of positioning blocks 193D-1 and 193D-3, respectively, and bottom edge 93-2 of container 91T1(t50) is generally aligned over beveled edge 195D-2 of positioning block 193D-2. Note that the downward-facing (i.e., backside) surface of container 91T1 is higher in the Z-axis direction than the uppermost surfaces of positioning blocks 193D-1 through 193D-3. FIG. 12B depicts the same portion of robotic work cell 100D at a time t51, which occurs after four-axis robot mechanism 150C moves robotic end-tool 160D-1 (and thus gripper structures 164D-1) downward such that container 90T1(t51) is moved into designated processing location PL-D (i.e., such that the downward-facing backside surface of container 91T1(t51) contacts an upper surface of base structure 191D, and such that outer peripheral surfaces 93-1, 93-2 and 93-3 of container 91T1(t51) are at least partially received within beveled edges 195D-1, 195D-2 and 195D-3, respectively, of positioning structure 190D). As also depicted in FIG. 12B, label applicator (processing device) 170D applies/mounts a brand/logo label 93F-1 onto front surface 92F (e.g., as described above with reference to FIGS. 11A and 11B) when container 91T1(t51) is in processing location PL-D. FIG. 12C depicts the same portion of robotic work cell 100D at a time t52, after four-axis robot 150C (FIG. 11B) moves carousel-type robotic end-tool 160D in an upward vertical direction, thereby causing gripper structures 164D-1(t52) to remove fully processed container 91T1(t52) from positioning structure 190D. Although the use of positioning structure 190D requires four-axis robot 150C (shown in FIGS. 11A and 11B) to perform the additional Z-axis movements described above with reference to FIGS. 12B and 12C, the precise positioning of container 91T1(t51) facilitates reliable and accurate application of brand/logo label 93F-1 in the central region of frontside surface 92F of container 91T1(t51), thereby avoiding the additional expense caused by erroneous label application.

Figure 13:
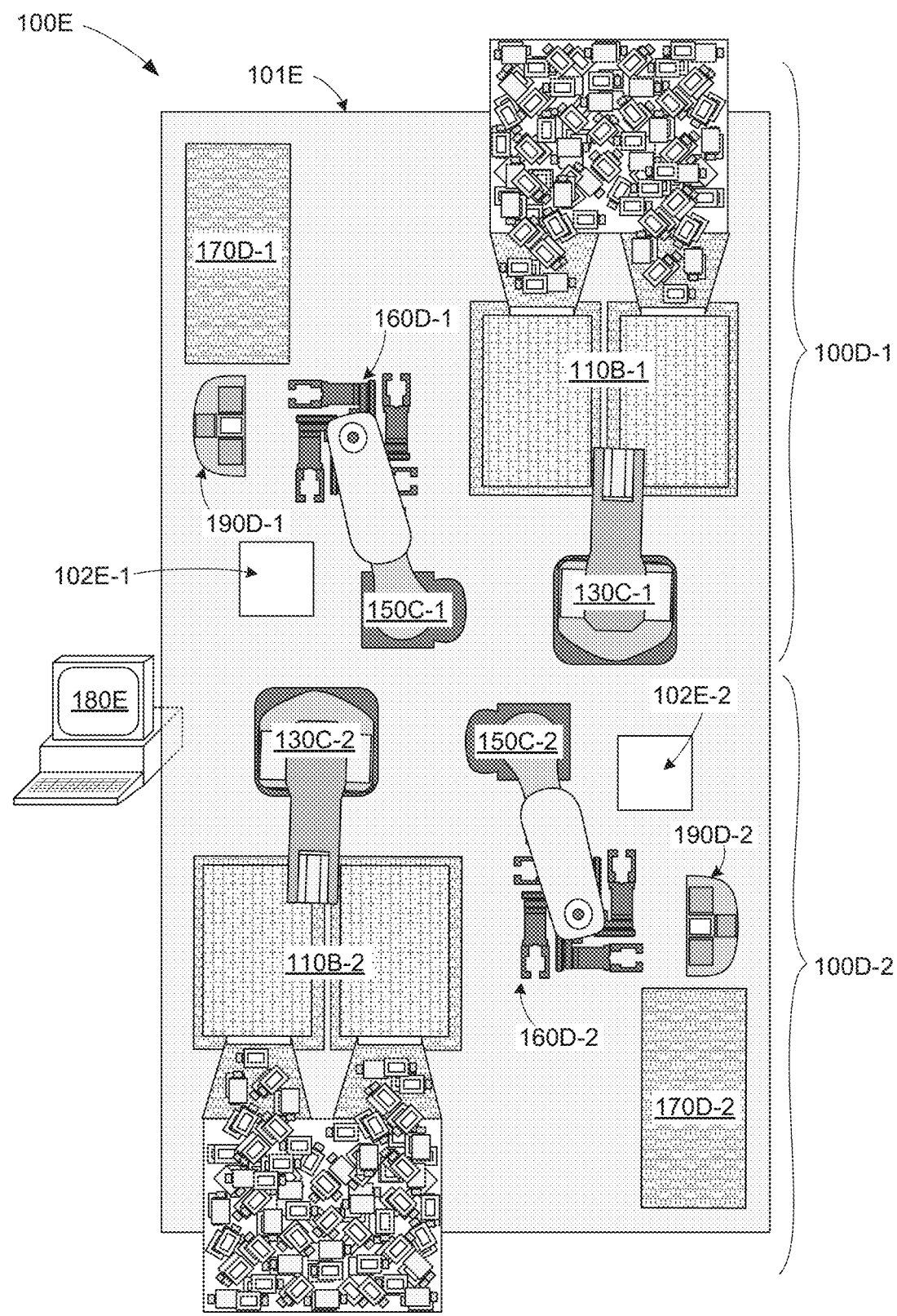
FIG. 13 is a top view depicting a robotic work cell including dual work cell units in a inverted mirror arrangement according to another alternative embodiment of the present invention.

FIG. 13 shows a robotic work cell 100E according to another exemplary specific embodiment in which two work cell units 100D-1 and 100D-2, each configured in accordance with robotic work cell 100D described above, are operably connected to an integral sheet-metal base plate 101E in an inverted mirror arrangement and are independently controlled by at least one control unit 180E that is at least partially disposed below base plate 101E. Specifically, referring to the upper portion of FIG. 13, work cell unit 100D-1 includes a first object separating mechanism 110B-1, a first pick-and-place robot mechanism 130C-1, a first 4-axis robot mechanism 150C-1 holding a first carousel-type robotic end-tool 160D-1, a first processing device 170D-1 and a first positioning structure 190D-1 that are connected to base plate 101E in the manner described above. Similarly, as indicated in the lower portion of FIG. 13, work cell unit 100D-2 includes a second object separating mechanism 110B-2, a second pick-and-place robot mechanism 130C-2, a second 4-axis robot mechanism 150C-2 holding a second carousel-type robotic end-tool 160D-2, a second processing device 170D-2 and a second positioning structure 190D-2 that are also connected to base plate 101E, but disposed in an inverted arrangement relative to corresponding components of first work cell unit 100D-1, such that the fixed portions of robot mechanisms 130C-1, 130C-2, 150C-1 and 150C-2 being located near a central region of base plate 101). In one embodiment, a shared power/control unit 180E is utilized to generate and transmit power and control signals (not indicated) to the various components such that both work cell units 100D-1 and 100D-2 independently operate in the manner described above to process bulk objects. In one embodiment, two exit ports 102E-1 and 102E-2 are cut or otherwise defined in base plate 101E to facilitate removal of fully processed objects released from robotic end-tools 160D-1 and 160D-2, respectively (i.e., such that the released fully processed objects fall through exit ports 102E-1 and 102E-2 and into one or more output bins). In a presently preferred practical embodiment base plate 101E is implemented as a table-top structure disposed on a steel base frame (not shown) that houses power/control unit 180E and associated resources, and a protective "fish bowl" frame (not shown) is formed above base plate 101E to protect the various components of work cell units 100D-1 and 100D-2, to protect humans, and to support cameras (not shown) utilized by the associated vision systems.

Although the present invention has been described with respect to certain specific embodiments, it will be clear to those skilled in the art that the inventive features of the present invention are applicable to other embodiments as well, all of which are intended to fall within the scope of the present invention.

The invention claimed is:

1. A robotic work cell for performing a process on a plurality of objects that are supplied to the robotic work cell in a randomly arranged three-dimensional (3D) cluster, the robotic work cell comprising:
    an object separating mechanism including a horizontal surface configured to receive at least a portion of the plurality of objects and a dynamic manipulator configured to apply a separating force such that the received portion forms a two-dimensional (2D) arrangement in which said objects are separated from each other;
    a vision system configured to capture current image data from the horizontal surface, to identify a target object of the portion of objects forming the 2D arrangement using the current image data to generate location data operably describing a location of the target object on the horizontal surface, and generating rotational orientation data describing an rotational orientation of the target object;
    a first robot mechanism including a first robotic arm that is controlled in accordance with the location data to move the target object from the horizontal surface to a designated hand-off location, and controlled in accordance with the rotational orientation data to rotate the target object into a designated hand-off orientation while moving the target object between the horizontal surface and the designated hand-off location;
    a second robot mechanism including a second robotic arm including an end-shaft aligned in a vertical direction;
    a carousel robotic end-tool having a central hub fixture that is fixedly connected to the end-shaft and at least one gripper mechanism connected to the central hub fixture such that said gripper mechanism including a pair of gripper structures; and
    a processing device operably configured and positioned to perform said process on said target object when said target object is positioned in a designated processing location,
    wherein the second robot mechanism is configured to manipulate the carousel robotic end-tool such that the gripper structures of the gripper mechanism are operably positioned in the designated hand-off location to grasp the target object when the target object is moved into the designated hand-off location by the first robot mechanism, and
    wherein the second robot mechanism is configured to rotate said carousel robotic end-tool around said vertical direction such that said grasped target object is moved by said gripper mechanism into said designated processing location.

2. The robotic work cell of claim 1, wherein the object separation mechanism comprises at least one separating unit, where each separating unit comprises:
    at least one conveyor belt configured such that an upward facing surface of the conveyor belt forms said horizontal surface;
    a stationary frame operably disposed around the upward facing surface such that objects are retained on the horizontal surface by the stationary frame during movement of the conveyor belt; and
    a gating mechanism configured to selectively pass said portion of the plurality of objects onto the horizontal surface.

3. The robotic work cell of claim 1,
    wherein the object separation mechanism comprises first and second separating units, said first separating unit including a first conveyor belt forming a first horizontal surface and said second separating unit including a second conveyor belt forming a second horizontal surface, said first and second conveyor belts being disposed in a parallel side-by-side arrangement, and
    wherein the vision system is further configured to capture first current image data from the first horizontal surface during a first time period and configured to capture second current image data from the second horizontal surface during a second time period.

4. The robotic work cell of claim 1,
    wherein the first robot mechanism comprises a six-axis robot including a base portion rigidly connected to a base plate, a multi-section arm portion extending from base portion, a distal end portion disposed at a distal end of said arm multi-section portion, and a suction cup disposed on said distal end portion,
    wherein the second robot mechanism comprises a four-axis robot including a base end fixedly connected to the base plate, and wherein the robotic work cell further comprises:
a vacuum system operably configured to transmit a suction force to the suction cup; and
a control unit configured to transmit control signals to the first robot mechanism, the vacuum system, the second robot mechanism and the carousel robotic end-tool.

5. The robotic work cell of claim 1,
wherein said carousel robotic end-tool comprises a gripper assembly including a mounting flange having a fixed end portion fixedly connected to said central hub fixture and a body portion that extends away from the central hub fixture, and
wherein said gripper mechanism is connected to the body portion of said mounting flange.

6. The robotic work cell of claim 5, wherein the body portion of said mounting flange includes a bearing ring structure and a motor mount structure, and
wherein said gripper assembly further comprises:
a bearing having a first portion rotatably connected to a second portion, said second portion being fixedly connected to the bearing ring structure;
a drive axle defining a horizontal axis and having a first end fixedly connected to said associated gripper mechanism and an opposing second end; and
a drive motor fixedly connected to the motor mount structure and operably connected to the second end of said drive axle such that a rotational drive force generated by the drive motor causes said associated gripper mechanism to rotate around said horizontal axis.

7. The robotic work cell of claim 1,
wherein the robotic work cell further comprises a positioning structure including a plurality of positioning structures disposed around said designated processing location, wherein each positioning structure includes a beveled side surface facing toward the designated processing location, and
wherein said second robot mechanism is further configured to move said target object into said designated processing location by moving said target object vertically such that side edges of said target object are received between the beveled side surface when the target object is disposed in the designated processing location.

8. The robotic work cell of claim 1,
wherein said object separating mechanism, said first robot mechanism, said second robot mechanism, said carousel robotic end-tool and said processing device form a first work cell unit,
wherein said robotic work cell further comprises a second work cell unit including a second object separating mechanism, a third robot mechanism, a fourth robot mechanism, a second carousel robotic end-tool and a second processing device, and
wherein the first and second work cell units are mounted in an inverted mirror arrangement on an integral base plate.

9. A method for performing a designated process on a plurality of objects that are randomly arranged in a three-dimensional (3D) cluster, method comprising:
forming at least a portion of the plurality of objects into a two-dimensional (2D) arrangement on a horizontal surface such that the portion of objects are separated from each other;
selecting a target object of the portion of objects forming the 2D arrangement, generating location data operably describing a location of the target object on the horizontal surface, and generating rotational orientation data describing a rotational orientation of the target object;
utilizing the location data to cause a pick-and-place robot mechanism to secure and remove the target object from the horizontal surface;
utilizing the rotational orientation data to cause the pick-and-place robot mechanism to rotate the target object into a designated hand-off orientation while moving the target object between the horizontal surface and a designated hand-off location;
controlling a four-axis robot mechanism to manipulate a carousel robotic end-tool such that a gripper mechanism is operably positioned to grasp the target object when the target object is moved into the designated hand-off location;
controlling the gripper mechanism to take possession of the target object from the pick-and-place robot mechanism when the target object is disposed in the designated hand-off location by the pick-and-place robot mechanism;
controlling the four-axis robot mechanism to rotate the carousel robotic end-tool such that the gripper mechanism moves the target object from the designated hand-off location to a designated processing location; and
performing said designated process on said target object when said target object is disposed in said designated processing location, wherein the horizontal surface comprises an upward facing surface of a horizontally arranged conveyor belt surrounded by a stationary frame, and wherein forming said 2D arrangement comprises:
capturing first current image data from the horizontal surface and utilizing the first current image data to determine a number of said objects disposed on the horizontal surface;
feeding one or more of said objects from said 3D cluster onto said horizontal surface when said determined number is less than a predetermined minimum number;
capturing second current image data from the horizontal surface and utilizing the second current image data to determine a spacing between said objects disposed on the horizontal surface; and
repeatedly driving said conveyor belt in opposite directions such that said objects disposed on the horizontal surface become separated.

10. The method of claim 9, wherein selecting said target object comprises capturing third current image data from the horizontal surface, identifying one or more said objects by comparing the current image data with stored image data, selecting said target object from said identified one or more objects and generating said location and rotational orientation data for said selected target object, and then transmitting said location and rotational orientation data to a pick-and-place robot mechanism.

11. The method of claim 9, wherein the horizontal surface comprises a first horizontal surface portion and a second horizontal surface portion, and
wherein the method comprises:
during a first time period, capturing third current image data of first objects disposed on the first horizontal surface portion while causing dynamic manipulation of second objects disposed on the second horizontal surface portion, and
during a second time period, capturing fourth current image data of said second objects disposed on the second horizontal surface portion while causing dynamic manipulation of third objects disposed on the first horizontal surface portion.

12. The method of claim 9, wherein the target object comprises a container including a cylindrical neck structure extending from a container body, and a cylindrical cap fixedly connected over the cylindrical neck,
- wherein utilizing the location data to move the target object comprises pressing a suction cup onto an upward facing surface of the container body and causing a vacuum system to transmit a suction force to the suction cup such that the target object is secured to the suction cup, and
- wherein controlling the gripper mechanism to take possession of the target object comprises controlling the gripper mechanism to press opposing gripper structures against opposite side surfaces of the cylindrical cap, and causing the vacuum system to terminate transmission of said suction force to the suction cup such that the target object is released from the suction cup.

13. The method of claim 9, further comprising, after controlling the gripper mechanism to take possession of the target object, rotating the gripper mechanism 180° around a horizontal axis before moving the target object into the designated processing location.

14. The method of claim 9, wherein the designated processing location is at least partially surrounded by a positioning structure, and wherein controlling the four-axis robot mechanism to move the target object to the designated processing location comprises:
- positioning the carousel robotic end-tool such that the target object is located over the designated processing location;
- moving the carousel robotic end-tool toward the designated processing location such that an outer peripheral surface of the target object is at least partially received within side edges of the positioning structure when the target object is disposed in the designated processing location, and
- wherein the method further comprises controlling the four-axis robot mechanism to move the carousel robotic end-tool away from the designated processing location after performing said designated process on said target object.

* * * * *